US012219208B2

(12) United States Patent
Seo et al.

(10) Patent No.: US 12,219,208 B2
(45) Date of Patent: *Feb. 4, 2025

(54) VIDEO PLAYBACK DEVICE AND CONTROL METHOD THEREOF

(71) Applicant: SAMSUNG ELECTRONICS CO., LTD., Suwon-si (KR)

(72) Inventors: Chanwon Seo, Suwon-si (KR); Yehoon Kim, Suwon-si (KR); Sojung Yun, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/470,173

(22) Filed: Sep. 19, 2023

(65) Prior Publication Data

US 2024/0031644 A1 Jan. 25, 2024

Related U.S. Application Data

(63) Continuation of application No. 17/881,135, filed on Aug. 4, 2022, now Pat. No. 11,831,948, which is a
(Continued)

(30) Foreign Application Priority Data

Jan. 4, 2018 (KR) .................. 10-2018-0001287

(51) Int. Cl.
*H04N 21/4402* (2011.01)
*G06N 3/08* (2023.01)
(Continued)

(52) U.S. Cl.
CPC ....... *H04N 21/440272* (2013.01); *G06N 3/08* (2013.01); *G06V 20/41* (2022.01);
(Continued)

(58) Field of Classification Search
CPC ..... H04N 21/440272; H04N 21/44008; H04N 21/4666; G06V 20/46; G06V 20/41; G06N 3/08
See application file for complete search history.

(56) References Cited

U.S. PATENT DOCUMENTS 6,330,344 B1 12/2001 Kondo et al.
6,674,799 B2 1/2004 Rhee
(Continued)

FOREIGN PATENT DOCUMENTS

CN 101438579 A 5/2009
CN 105354543 A 2/2016
(Continued)

OTHER PUBLICATIONS

Communication dated Aug. 6, 2020, from the European Patent Office in European Application No. 19735892.2.
(Continued)

*Primary Examiner* — Nnenna N Ekpo
(74) *Attorney, Agent, or Firm* — Sughrue Mion, PLLC

(57) ABSTRACT

Provided are an artificial intelligence (AI) system that mimics cognitive functions, such as cognition and judgment, of the human brain using a machine learning algorithm such as deep learning and applications thereof. More particularly, provided is a device including a memory storing least one program and a first video, a display, and at least one processor configured to display the first video on at least one portion of the display by executing the at least one program, wherein the at least one program includes instructions for: comparing an aspect ratio of the first video with an aspect ratio of an area in which the first video is to be displayed, generating a second video corresponding to the aspect ratio of the area by using the first video when the aspect ratio of the first video is different from the aspect ratio of the area, and displaying the second video in the area, wherein the
(Continued)

generating of the second video is performed by inputting at least one frame of the first video to an AI neural network.

20 Claims, 27 Drawing Sheets

Related U.S. Application Data continuation of application No. 16/959,477, filed as application No. PCT/KR2019/000106 on Jan. 3, 2019, now Pat. No. 11,457,273.

(51) Int. Cl.
*G06V 20/40* (2022.01)
*H04N 21/44* (2011.01)
*H04N 21/466* (2011.01)

(52) U.S. Cl.
CPC ....... *G06V 20/46* (2022.01); *H04N 21/44008* (2013.01); *H04N 21/4666* (2013.01)

(56) References Cited

U.S. PATENT DOCUMENTS

| | | | |
|---|---|---|---|
| 7,986,854 B2 | 7/2011 | Kim et al. | |
| 8,111,328 B2 | 2/2012 | Fujisawa | |
| 8,599,313 B2 | 12/2013 | Barenbrug et al. | |
| 9,390,465 B2 | 7/2016 | Koh et al. | |
| 9,542,621 B2 | 1/2017 | He et al. | |
| 9,594,947 B1 | 3/2017 | Kotagiri et al. | |
| 10,224,008 B2 | 3/2019 | Asada | |
| 10,460,231 B2 | 10/2019 | Zhang et al. | |
| 2003/0035482 A1 | 2/2003 | Klompenhouwer et al. | |
| 2010/0053442 A1* | 3/2010 | Kudo | H04N 21/4828 348/581 |
| 2011/0261255 A1 | 10/2011 | Nagata | |
| 2012/0287164 A1* | 11/2012 | Koh | G06T 3/04 345/667 |
| 2013/0050574 A1 | 2/2013 | Lu et al. | |
| 2014/0218395 A1 | 8/2014 | Momonoi et al. | |
| 2014/0314269 A1 | 10/2014 | Chen | |
| 2016/0125572 A1 | 5/2016 | Yoo et al. | |
| 2016/0249010 A1 | 8/2016 | Greene | |
| 2017/0018054 A1 | 1/2017 | Holzer et al. | |
| 2017/0185871 A1* | 6/2017 | Zhang | G06V 10/82 |
| 2017/0193362 A1 | 7/2017 | Cremer et al. | |
| 2018/0046361 A1 | 2/2018 | Shah | |
| 2019/0294907 A1 | 9/2019 | Yoo et al. | |

FOREIGN PATENT DOCUMENTS

| | | |
|---|---|---|
| CN | 106934426 A | 7/2017 |
| CN | 107087201 A | 8/2017 |
| CN | 107197260 A | 9/2017 |
| KR | 10-0323678 B1 | 2/2002 |
| KR | 10-0505516 B1 | 12/2005 |
| KR | 10-2007-0118756 A | 12/2007 |
| KR | 10-1303017 B1 | 9/2013 |
| KR | 10-2016-0053612 A | 5/2016 |
| KR | 10-2017-0078516 A | 7/2017 |
| WO | 2014/122798 A1 | 8/2014 |
| WO | 2016013349 A1 | 1/2016 |

OTHER PUBLICATIONS

International Search Report (PCT/ISA/210) in International Application No. PCT/KR2019/000106, issued on Apr. 18, 2019.
Written Opinion (PCT/ISA/237) in International Application No. PCT/KR2019/000106, issued on Apr. 18, 2019.
Communication dated Sep. 29, 2021 issued by the Intellectual Property Office of the P.R. China in application No. 201980007493.2.
Communication dated Apr. 2, 2022 issued by the China National Intellectual Property Administration in Chinese Application No. 201980007493.2.
Communication issued Dec. 15, 2022 by the European Patent Office for EP Patent Application No. 19735892.2.
Communication dated Aug. 1, 2023 from the European Patent Office in European Application No. 19735892.2.
Communication dated Oct. 20, 2023, issued by the European Patent Office in counterpart European Application No. 19 735 892.2.
Office Action dated Apr. 1, 2024, issued by the Korean Intellectual Property Office in Korean Application No. 10-2019-0000867.
Communication dated Feb. 5, 2024, issued by the State Intellectual Property Office of the P.R. China in Application No. 202211213615.3.
Communication issued Jan. 15, 2024 by the European Patent Office in European Application No. 23201757.4.
Communication dated Aug. 10, 2024, issued by the National Intellectual Property Administration, PRC in Chinese Application No. 202211213615.3.

\* cited by examiner

VIDEO PLAYBACK DEVICE AND CONTROL METHOD THEREOF

CROSS-REFERENCE TO RELATED APPLICATIONS

This application is a continuation application of U.S. patent application Ser. No. 17/881,135, filed on Aug. 4, 2022, which is a continuation application of U.S. patent application Ser. No. 16/959,477, filed on Jul. 1, 2020, which is now U.S. Pat. No. 11,457,273, issued on Sep. 27, 2022, which is a National Stage Entry of International Application No. PCT/KR2019/000106, filed on Jan. 3, 2019, which claims priority to Korean Patent Application 10-2018-0001287, filed on Jan. 4, 2018, in the Korean Intellectual Property Office, the disclosures of which are incorporated by reference herein in their entireties.

TECHNICAL FIELD

The present disclosure relates to a video playback device and a control method thereof.

BACKGROUND ART

A device including a display may output a video on the display upon receiving a signal from the outside and also output a video in the display using prestored data.

When the device plays back the video using the display, a portion of a display area of the display may be shown in black when an aspect ratio of a video is different from an aspect ratio of the display area of the display. Recently, various methods for playing back a video in devices without an area shown in black have been suggested.

Meanwhile, artificial intelligence (AI) technology has recently been used to play back or generate a video in devices.

AI systems refer to computer systems that mimic human-level intelligence. Unlike conventional rule-based smart systems, AI systems are systems that are trained, determine, and evolve to be smarter. The more an AI system is used, the more the recognition rate of the AI system may improve and the AI system may more accurately understand user preference. Thus, conventional rule-based smart systems are being gradually replaced with deep learning-based AI systems.

AI technology is composed of machine learning (deep learning) and elementary technology utilizing machine learning.

Machine learning is algorithm technology that classifies and learns characteristics of input data, and elementary technology is technology using a machine learning algorithm such as deep learning and consists of technical fields including linguistic understanding, visual understanding, inference/prediction, knowledge expression, operation control, and the like.

AI technology is applied in various fields as follows. Linguistic understanding is a technique for recognizing and applying/processing human language/characters and includes natural language processing, machine translation, dialogue system, question and answering, speech recognition/synthesis, and the like. Visual understanding is a technique for recognizing and processing objects like as done in human vision and includes object recognition, object tracking, image search, human recognition, scene understanding, spatial understanding, image enhancement, and the like. Inference/prediction is a technique for judging information and logically inferring and predicting a result and includes knowledge/probability-based inference, optimization prediction, preference-based planning, recommendation, and the like. Knowledge representation is a technique for automatically processing human experience information into knowledge data and includes knowledge building (data generation/classification), knowledge management (data utilization), and the like. Operation control is a technique for controlling autonomous running of vehicles and motion of robots and includes motion control (navigation, collision avoidance, and driving), operation control (behavior control), and the like.

DESCRIPTION OF EMBODIMENTS

Technical Problem

Provided is a device for displaying a video without a distorted aspect ratio, so that a letterbox is not displayed on a screen of the device when an aspect ratio of a video is different from an aspect ratio of the screen.

Technical problems to be solved are not limited to those mentioned above, and other technical problems may exist.

Solution to Problem

According to a first aspect of the present disclosure, a device includes a memory storing at least one program and a first video, a display, and at least one processor configured to display the first video on at least one portion of the display by executing the at least one program, wherein the at least one program includes instructions for comparing an aspect ratio of the first video with an aspect ratio of an area in which the first video is to be displayed, generating a second video corresponding to the aspect ratio of the area by using the first video when the aspect ratio of the first video is different from the aspect ratio of the area, and displaying the second video in the area, wherein the generating of the second video is performed by inputting at least one frame of the first video to an AI neural network.

In addition, the generating of the second video may further include extracting frames included in the first video, generating training data to be input to the AI neural network based on the extracted frames; and generating the second video by training the AI neural network by inputting the training data to the AI neural network.

In addition, the generating of the second video may include generating training data by allocating a weight to preset pixels located at edges of the reference frame included in the first video.

In addition, the device may further include a communicate interface configured to transmit the first video to a server and receive the AI neural network generated by the server using the first video from the server, and the second video may be generated by inputting at least one frame of the first video to the AI neural network received from the server.

In addition, the generating of the second video may include identifying a letterbox to be displayed in the area when the aspect ratio of the first video is different from the aspect ratio of the area, and generating the second video including an expanded video to be displayed in the letterbox.

In addition, the generating of the second video may include generating a frame of the second video corresponding to a reference frame by training the AI neural network by inputting, to the AI neural network, the reference frame being included in the first video, at least one previous frame, and at least one next frame.

In addition, the generating of the second video may be performed by generating a frame of the second video corresponding to the reference frame by training the AI neural network by inputting, to the AI neural network, the reference frame being included in the first video and a resized frame obtained by resizing the reference frame.

In addition, the device further may further include a communicate interface configured to perform communication through the Internet, and the generating of the second video may include detecting at least one of a pattern and a color constituting the reference frame included in the first video, searching for an image related to the detected at least one of the pattern and color by using the communicate interface, and generating a frame of the second video corresponding to the reference frame by training the AI neural network by inputting the reference frame and the searched for image to the AI neural network.

In addition, the generating of the second video may include generating a frame of the second video corresponding to the reference frame by training the AI neural network by inputting the reference frame, the searched for image, and a resized image obtained by resizing the reference frame to the AI neural network, wherein the aspect ratio of the resized image is adjusted to correspond to the aspect ratio of the area by resizing the searched for image.

According to a second aspect of the present disclosure, a device includes a memory storing at least one program, a communicate interface configured to receive a video list from a server, a user input interface configured to receive a user input to select a first video to be downloaded from the video list, a display including an area where the first video is to be displayed, and at least one processor configured to play back the first video by executing the at least one program, wherein the at least one program includes instructions for receiving the video list from the server, receiving a user input to select the first video, transmitting identification information of the first video and information on an aspect ratio of the area to the server, comparing the aspect ratio of the first video with the aspect ratio of the area, obtaining a second video corresponding to the aspect ratio of the area by using the first video when the aspect ratio of the first video is different from the aspect ratio of the area, and the displaying the second video in the area, wherein the second video is generated by inputting at least one frame of the first video to the AI neural network.

According to a third aspect of the present disclosure, a method of displaying a video includes comparing an aspect ratio of a first video with an aspect ratio of an area in which the first video is to be displayed, generating a second video corresponding to the aspect ratio of the area by using the first video when the aspect ratio of the first video is different from the aspect ratio of the area, and displaying the second video in the area, wherein the generating of the second video is performed by inputting at least one frame of the first video to an AI neural network.

In addition, the generating of the second video may include extracting frames included in the first video, generating training data to be input to the AI neural network based on the extracted frames, and generating the second video by training the AI neural network by inputting the training data to the AI neural network.

In addition, the generating of the second video may include generating training data by allocating a weight to preset pixels located at edges of the reference frame included in the first video.

In addition, the generating of the second video may further include transmitting the first video to the server and receiving, from the server, the AI neural network generated by the server using the first video, and the second video is generated by inputting at least one from of the first video to the AI neural network received from the server.

In addition, the generating of the second video may include identifying a letterbox to be displayed in the area when the aspect ratio of the first video is different from the aspect ratio of the area, and generating the second video including an expanded video to be displayed in the letterbox.

In addition, the generating of the second video may include generating a frame of the second video corresponding to the reference frame by training the AI neural network by inputting, to the AI neural network, the reference frame being included in the first video, at least one previous frame, and at least one next frame.

In addition, the generating of the second video may include generating a frame of the second video corresponding to the reference frame by training the AI neural network by inputting, to the AI neural network, the reference frame being included in the first video and a resized frame obtained by resizing the reference frame.

In addition, the generating of the second video may include detecting at least one of a pattern and a color constituting the reference frame included in the first video, searching for an image related to the detected at least one of the pattern and color, and generating a frame of the second video corresponding to the reference frame by training the AI neural network by inputting the reference frame and the searched for image to the AI neural network.

In addition, the generating of the second video may include generating a frame of the second video corresponding to the reference frame by training the AI neural network by inputting the reference frame, the searched for image, and a resized image obtained by resizing the reference frame to the AI neural network, wherein the aspect ratio of the resized image is adjusted to correspond to the aspect ratio of the area by resizing the searched for image.

According to a fourth aspect of the present disclosure, a method of displaying a video includes receiving a video list from a server, receiving a user input to select a first video to be downloaded from the video list, transmitting identification information of the first video and information on an aspect ratio of an area where the first video is to be displayed to the server, comparing the aspect ratio of the first video with the aspect ratio of the, obtaining a second video corresponding to the aspect ratio of the area by using the first video when the aspect ratio of the first video is different from the aspect ratio of the area, and displaying the second video in the area, wherein the second video is generated by inputting at least one frame of the first video to an AI neural network.

According to a fifth aspect of the present disclosure, a method of displaying a video includes comparing an aspect ratio of a first video with an aspect ratio of a screen included in a display on which the first video is to be displayed, identifying the existence of an expanded video generation module corresponding to the first video based on a comparison result, generating a first expanded video generation module corresponding to the first video by updating a pre-stored trained model for generating an expanded video using at least one portion of the first video based on an identification result, generating an expanded video to be displayed in a letterbox by inputting the first video to the first expanded video generation module, and displaying a second video generated by combining the first video with the expanded video on the screen, wherein the letterbox is an area displayed due to a difference between the aspect ratio of the first video and the aspect ratio of the screen when the first video is played back on the screen, and the aspect ratio of the second video is identical to the aspect ratio of the screen.

According to a sixth aspect of the present disclosure, a device includes a display including a screen on which a first video is to be displayed, at least one memory storing a trained model for generating an expanded video and the first video, and at least one processor including at least one of a graphics processing unit (GPU) and a NPU, wherein the processor compares an aspect ratio of the first video with an aspect ratio of the screen, identifies whether a first expanded video corresponding to a video generation module is stored in the at least one memory based on a comparison result, generates a first expanded video generation module corresponding to the first video by updating a pre-stored trained model for generating an expanded video using at least one portion of the first video via at least one of the GPU and the NPU based on an identification result, and controls the at least one memory to store the generated first expanded video generation module, generates an expanded video to be displayed in a letterbox by inputting the first video to the first expanded video generation module via at least one of the GPU and the NPU, and controls the display to display a second video generated by combining the first video with the expanded video on the screen, wherein the letterbox is an area displayed due to a difference between the aspect ratio of the first video and the aspect ratio of the screen when the first video is played back on the screen.

MODE OF DISCLOSURE

Figure 1:
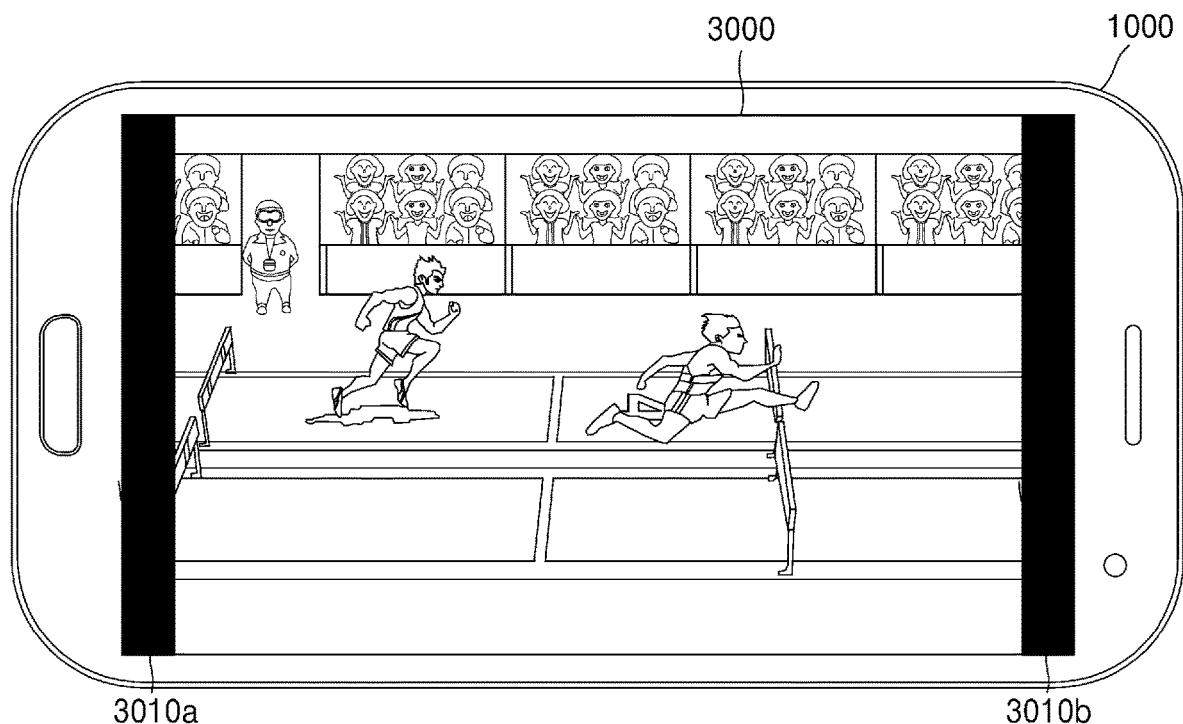
FIG. 1 is a diagram exemplarily illustrating a screen of a device on which an expanded video is displayed in a letterboxed area, according to an embodiment.
Figure 1:
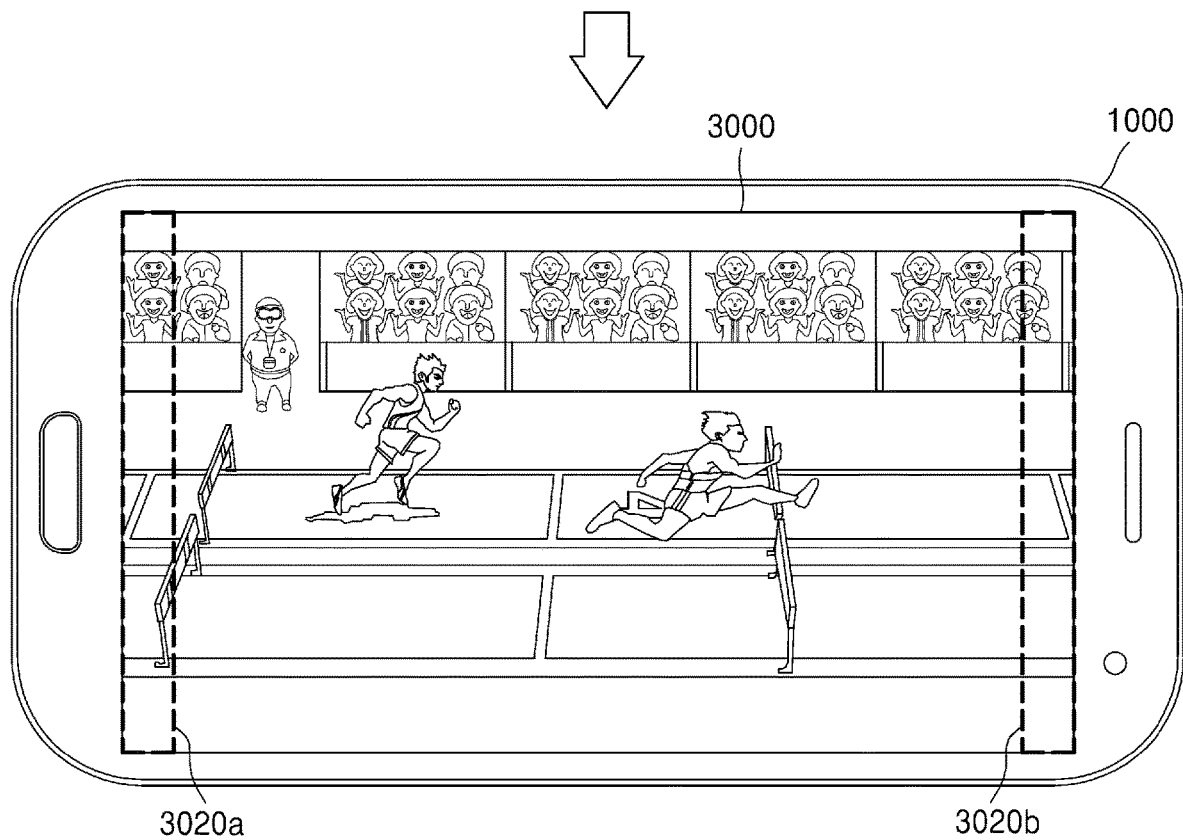

The present disclosure will now be described more fully with reference to the accompanying drawings for one of ordinary skill in the art to be able to perform the present disclosure without any difficulty. The present disclosure may, however, be embodied in many different forms and should not be construed as being limited to the embodiments set forth herein. In the drawings, portions unrelated to the descriptions are omitted for clear description of the present disclosure for clarity and the same or similar elements are denoted by the same reference numerals throughout the specification.

Some embodiments of the present disclosure may be described in terms of functional block components and various processing steps. Some or all of functional blocks may be realized by any number of hardware and/or software components configured to perform the specified functions. For example, the functional blocks of the present disclosure may be implemented by one or more microprocessors or may be implemented by circuit components for preset functions. In addition, for example, the functional blocks of the present disclosure may be implemented with any programming or various scripting languages. The functional blocks may be implemented in algorithms that are executed on one or more processors. Furthermore, the present disclosure could employ any number of techniques according to the related art for electronics configuration, signal processing and/or data processing, and the like. The terms "mechanism", "element", "means", "configuration", or the like may be broadly used and are not limited to mechanical or physical components.

Throughout the specification, it will also be understood that when an element is referred to as being "connected to" another element, it can be "directly connected to" the other element, or it can be "electrically connected to" the other element by having an intervening element interposed therebetween. Throughout the specification, the term "include" an element do not preclude the other elements but further includes an element unless otherwise stated.

Furthermore, connecting lines or connectors between elements shown in drawings are intended to represent exemplary functional connection and/or physical or circuit connection between the elements. In actual devices, connection between the elements may be represented by replaceable or added various functional connection, physical connection, or circuit connection.

It will be understood that, although the terms "first", "second", etc., may be used herein to describe various elements, these elements should not be limited by these terms. The above terms are used only to distinguish one component from another.

Hereinafter, for the convenience of description, at least one portion of a screen of a device 1000 on which a first video 3000 is to be displayed is referred to as a first area. In addition, hereinafter, the first area will be described as the entire area of the screen of the device 1000 for the convenience of description first area, but the embodiment is not limited thereto.

Hereinafter, the present disclosure will be described in detail with reference to the attached drawings.

FIG. 1 is a diagram exemplarily illustrating a screen of a device 1000 on which expanded videos 3020a and 3020b are displayed in letterboxes 3010a and 3010b according to an embodiment.

Referring to FIG. 1, the device 1000 may play back and display the first video 3000 in the first area.

An aspect ratio of the first video 3000 displayed in the first area may be different from an aspect ratio of the first area in which the first video 3000 is displayed. When the aspect ratio of the first video 3000 is different from the aspect ratio of the first area, letterboxes 3010a and 3010b may be displayed in the first area when the video is displayed in the first area.

When the letterboxes 3010a and 3010b are displayed in the first area, a user may feel that the first video 3000 is smaller than an actual size. Conventionally, the first video 3000 is displayed on the first area after cropping top and bottom portions or left and right side portions thereof not to display the letterboxes 3010a and 3010b in the first area. Alternatively, the first video 3000 is resized such that the aspect ratio of the first video 3000 corresponds to the aspect ratio of the first area.

When a portion of the first video 3000 is cropped, all information included in the first video 3000 is not displayed in the first area. Because the user watches only the portion of the first video 3000, there is a problem that the user may miss the intention of a producer of the video.

In addition, when the first video 3000 is resized, the aspect ratio of the first video 3000 is modified so that the user watches a distorted video. There is a problem that the user feels uncomfortable while watching the distorted video.

In order to solve the above problems, the present disclosure provides a device for generating the expanded videos 3020a and 3020b not to distort the first video 3000, not to display the letterbox, and to display all information included in the first video 3000 by using AI neural network technology and a method of displaying the video.

The present disclosure also provides a device for generating a second video including the generated expanded videos 3020a and 3020b and the first video 3000 and a method of displaying the video. The present disclosure also provides a device in which an aspect ratio of the generated second video corresponds to an aspect ratio of the first area and a method of displaying the video. The present disclosure also provides a device for displaying the generated second video in the first area and a method of displaying the video.

The expanded videos 3020a and 3020b refer to images generated using the AI neural network technology and displayed in the letterboxes 3010a and 3010b without disharmony with the first video 3000.

The first video 3000 may include at least one scene, and the scene may include at least one segment. The segment may include at least one frame.

According to an embodiment of the present disclosure, the expanded videos 3020a and 3020b may be generated by inputting at least one frame included in the first video 3000 to an AI neural network. Also, the second video may be generated by inputting at least one frame included in the first video 3000 to the AI neural network.

According to an embodiment of the present disclosure, the AI neural network may include at least one of a learner, a trained model, and an expanded video generation module. The expanded video generation module may be generated by inputting training data to the trained model. By inputting at least one frame included in the first video 3000 to the expanded video generation module, at least one of the expanded video and the second video may be generated. The trained model and the expanded video generation module may be composed of one AI neural network or separate AI neural networks. The learner may be an algorithm configured to generate an expanded video generation module 2440 by updating the trained model by inputting training data to the trained model.

According to an embodiment of the present disclosure, the device 1000 may be manufactured with a pre-generated expanded video generation module built therein. The device 1000 may generate an expanded video by inputting a video to the built-in expanded video generation module.

According to an embodiment of the present disclosure, the device 1000 may be manufactured with the trained model built therein. The device 1000 may generate the expanded video generation module by applying training data to the trained model. The device 1000 may refine the expanded video generation module by continuously applying training data to the trained model. For example, the device 100 may input training data to the trained model and control the learner to generate (or refine) the expanded video generation module by updating the trained model using the training data. A process of generating the expanded video generation module using the learner will be described below with reference to FIG. 24. The device 1000 may generate the expanded videos 3020a and 3020b by inputting the first video 3000 to the expanded video generation module.

According to an embodiment of the present disclosure, the device 1000 may receive an expanded video generation module generated by a trained model built in a server 2000 from the server 2000. The device 1000 may receive a refined expanded video generation module by applying training data to the trained model built in the server 2000. For example, the device 1000 may receive an expanded video generation module generated by inputting the trained model and training data to a learner included in the server 2000. The device

1000 may generate the expanded videos 3020*a* and 3020*b* by inputting the first video 3000 to the expanded video generation module.

According to an embodiment of the present disclosure, the device 1000 may receive a second video generated in the server 2000 and including the first video and the expanded video corresponding to the first video. The device 1000 may display the second video on the screen. In this case, the expanded videos 3020*a* and 3020*b* corresponding to the first video may be videos generated by inputting at least one frame of the first video to the expanded video generation module generated by the trained model built in the server 2000.

Figure 2:
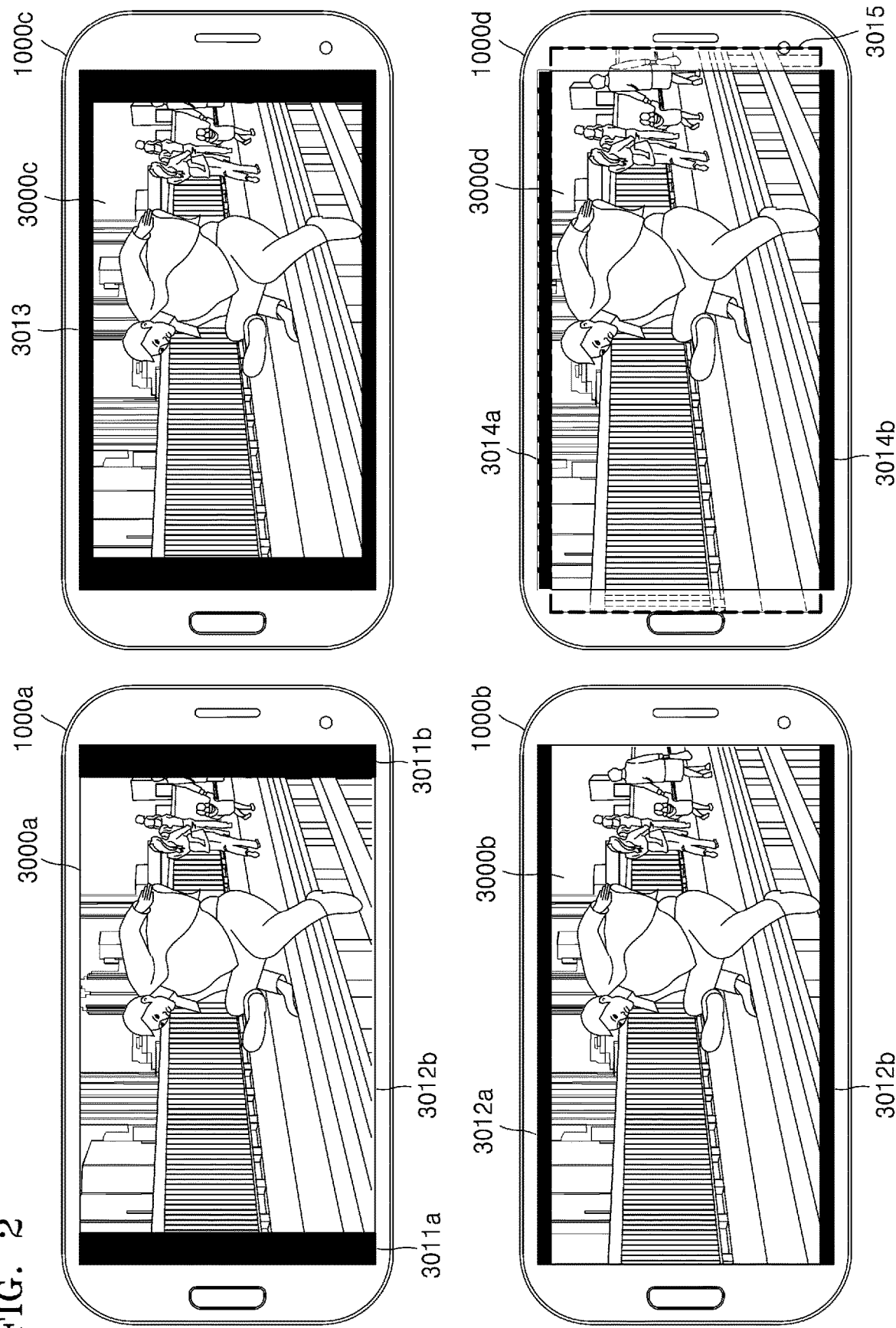
FIG. 2 is a diagram illustrating various shapes of a letterbox displayed on a screen of a device, according to an embodiment.

FIG. 2 is a diagram illustrating various shapes of a letterbox displayed on a screen of a device according to an embodiment.

Referring to FIG. 2, a letterbox may be displayed in various shapes in the first area. For example, letterboxes 3011*a* and 3011*b* may be displayed at portions in the vicinity of left and right sides of a video 3000*a* displayed in a first area of a device 1000*a*. In another example, letterboxes 3012*a* and 3012*b* may be displayed at portions in the vicinity of top and bottom sides of a video 3000*b* displayed in a first area of a device 1000*b*. In another example, a letterbox 3013 may be displayed at portions in the vicinity of all four sides of a video 3000*c* displayed in a first area of a device 1000*c*. In another example, letterboxes 3014*a* and 3014*b* may be displayed at portions in the vicinity of at least one of the left and right sides and the top and bottom sides of a video 3000*d* displayed in a first area of a device 1000*d*.

According to an embodiment of the present disclosure, an expanded video to be displayed in the letterbox may be generated regardless of the shape of the letterbox displayed in the first area. That is, according to the present disclosure, an expanded video to be displayed in the letterboxed area may be generated when the letterbox is displayed at portions in the vicinity of left and right sides of the video, portions in the vicinity of top and bottom sides of the video, portions in the vicinity of all four sides of the video, and at least one of the portions in the vicinity of at least one of the left and right sides and the top and bottom sides. Hereinafter, although a case in which the letterbox is displayed at left and right sides of the video is described by way of example, it will be obvious to those skilled in the art that the present disclosure may also be applied to the other cases.

Figure 3:
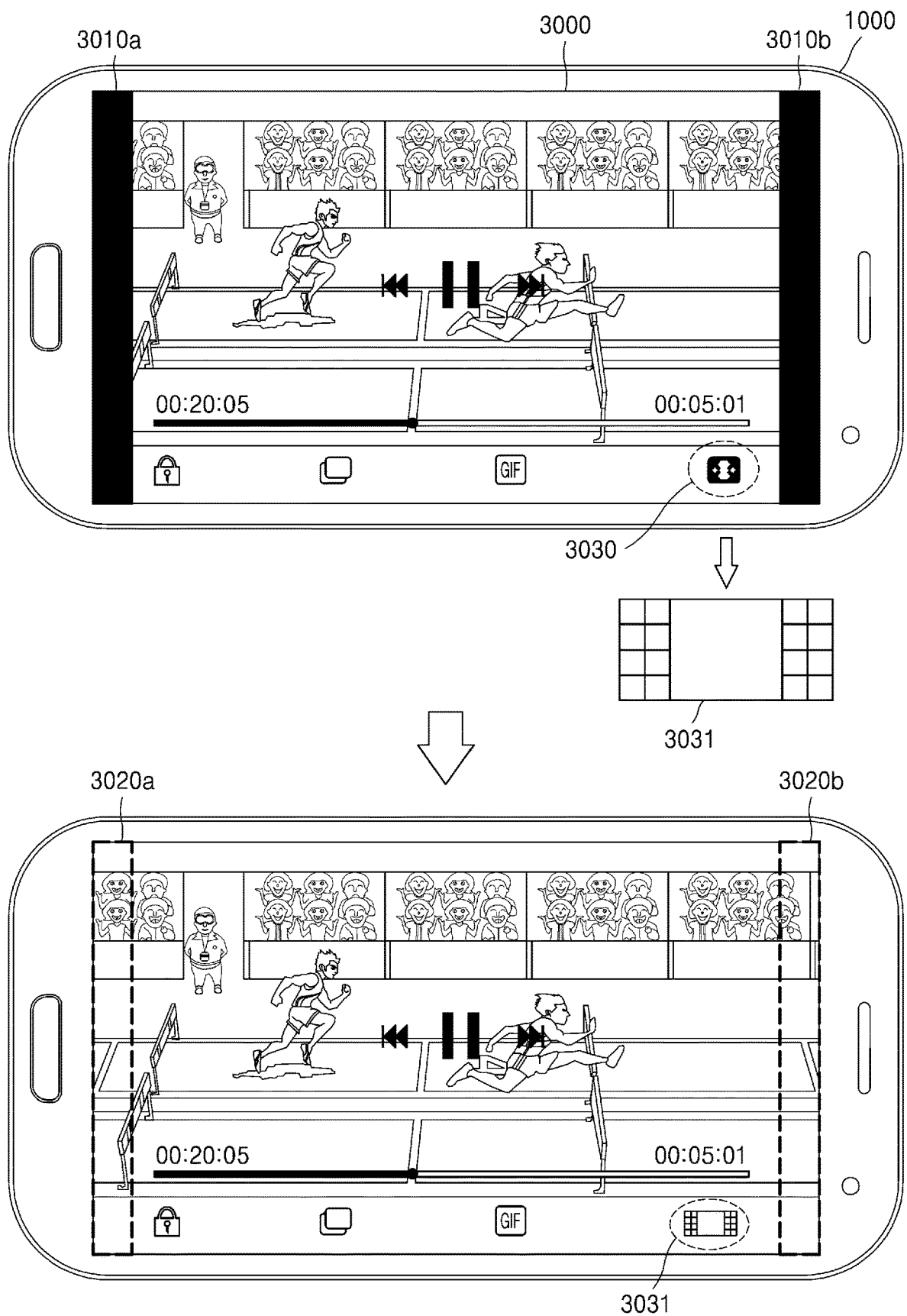
FIG. 3 is a diagram illustrating a user interface (UI) used to display an expanded video on a screen of a device, according to an embodiment.

FIG. 3 is a diagram illustrating a user interface UI used to display an expanded video on a screen of a device according to an embodiment.

Referring to FIG. 3, the first area may include an icon 3030 allowing the user to select a shape in which the first video 3000 is displayed.

According to an embodiment, the icon 3030 may include an icon to display the first video 3000 in an original aspect ratio, an icon to resize the first video 3000 in accordance with the aspect ratio of the first area and display the resized video, and an icon to crop a portion of the first video 3000 in accordance with the aspect ratio of the first area and display the cropped video. In addition, the icon 3030 may include an icon 3031 to display the expanded video.

According to an embodiment, the device 1000 may receive a user input to modify the icon 3030. The device 1000 may modify the icon 3030 in accordance with the user input and display the first video 3000 in the first area to correspond to the modified icon 3030. For example, the device 1000 may modify the icon 3030 to the icon 3031 to display the expanded video in response to the user input. The device 1000 may display the first video 3000 and the expanded videos 3020*a* and 3020*b* in the first area to correspond to the modified icon 3031.

Figure 4:
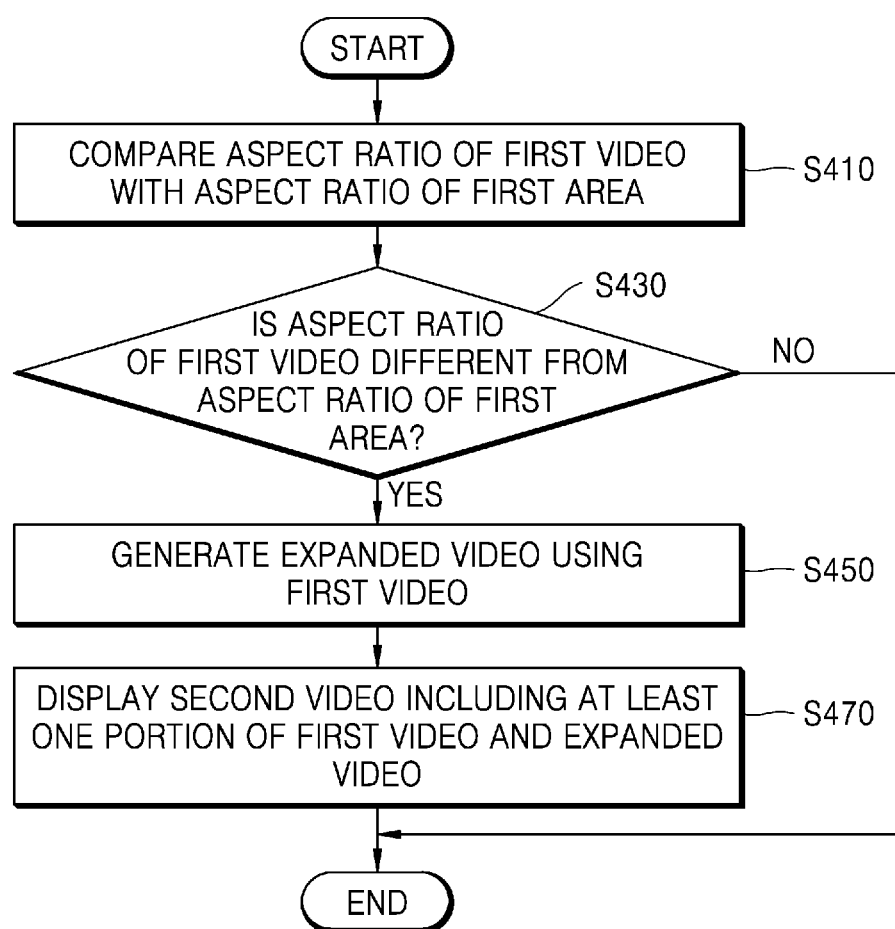
FIG. 4 is a flowchart illustrating a method of displaying a video including an expanded video on a screen of a display, according to an embodiment.

FIG. 4 is a flowchart illustrating a method of displaying a video including an expanded video on a screen of a display according to an embodiment.

Referring to operation S410 of FIG. 4, the device 1000 may compare the aspect ratio of the first video to be displayed in the first area (e.g., 4:3, 16:9, and 2.35:1) with the aspect ratio of the first area (e.g., 3:2, 4:3, 16:9, 16:10, and 18:9).

That is, the aspect ratio of the first video may be determined by the intention of the video producer and the first video may be generated in accordance with the determined aspect ratio. For example, the first video may be generated in an aspect ratio of 16:9.

The aspect ratio of the first area may be determined when the device 1000 is manufactured. In addition, the aspect ratio of the first area may be determined by a user input received from the user. Also, the aspect ratio of the first area may be determined by a ratio set by a program operating in the device 1000. The aspect ratio of the first area may be 18:9.

Referring to operation S430, the device 1000 may determine whether the aspect ratio of the first video is different from the aspect ratio of the first area by comparing the aspect ratio of the first video with the aspect ratio of the first area. For example, when the aspect ratio of the first video is 16:9 and the aspect ratio of the first area is 18:9, the device 1000 may determine that the aspect ratio of the first video is different from the aspect ratio of the first area. In another example, when the aspect ratio of the first video is 16:9 and the aspect ratio of the first area is 16:9, the device 1000 may determine that the aspect ratio of the first video is not different from the aspect ratio of the first area.

Referring to operation S450, the device 1000 may generate an expanded video using the first video.

According to an embodiment, the device 1000 may generate an expanded video to be displayed in the letterboxed area which will be generated because the aspect ratio of the first video is different from the aspect ratio of the first area.

The device 1000 may identify the letterboxed area and generate the expanded video to be displayed in the letterboxed area. For example, when the aspect ratio of the first video is 16:9 and the aspect ratio of the first area is 18:9, the device 1000 may identify letterboxed areas located at portions in the vicinity of left and right sides of the first video. In another example, when the aspect ratio of the first video is 2.35:1 and the aspect ratio of the first area is 16:9, the device 1000 may identify letterboxed areas located at portions in the vicinity of top and bottom sides of the first video.

According to an embodiment, the device 1000 may generate an expanded video and a second video by inputting the first video to an AI neural network built in the device 1000. In this case, the second video may include at least one portion of the first video and the expanded video. For example, the device 1000 may generate the expanded video by inputting the first video to an expanded video generation module built in the device 1000. In this case, the expanded video generation module built in the device 1000 may be built therein when the device 1000 is manufactured. Alternatively, the expanded video generation module built in the device 1000 may be generated from a trained model built in the device 1000. Also, the expanded video generation module built in the device 1000 may be generated in a server and received from the server.

According to an embodiment, the device 1000 may generate the expanded video generation module by inputting at least one frame included in the first video to the AI neural network. In this case, the second video may include at least one portion of the first video and the expanded video. For example, the device 1000 may generate the expanded video generation module by inputting at least one frame included in the first video to the expanded video generation module.

That is, by inputting all frames included in the first video to the expanded video generation module, the device 1000 may generate expanded videos and second videos respectively corresponding to all frames of the first video. Alternatively, by inputting some frames (e.g., reference frames) included in the first video to the expanded video generation module, the device 1000 may generate expanded videos and second videos respectively corresponding to all frames of the first video.

According to an embodiment, the device 1000 may generate expanded videos and second videos corresponding to the reference frame and frames related to the reference frame by inputting the reference frame to the expanded video generation module. In this regard, the reference frame is a frame selected as necessary to generate the expanded video. The reference frame may include a frame essentially input to the expanded video generation module. The reference frame may be one or more. The frames related to the reference frame may include frames similar to the reference frame (e.g., frames decoded by a decoder with reference to the reference frame), frames having the same pixels as those of the reference frame by at a preset ratio or more, and frames played before and after a preset time from the reference frame.

For example, the reference frame may be an intra-frame. Intra-frame refers to a frame decoded by a decoder in the absence of other referential frames.

In another example, the reference frame may be a frame the most suitable for generating an expanded video among a plurality of frames constituting a segment of the first video segment. The reference frame may be a frame the most similar to a plurality of frames among the plurality of frames constituting a segment of the first video. Specifically, the reference frame may be a first frame among the plurality of frames constituting the segment. Alternatively, the reference frame may be an intermediate frame among the plurality of frames. Alternatively, the reference frame may be a frame including the largest number of pixels identical to those of the other frames among the plurality of frames.

When the device 1000 generates the expanded video, a lot of computing resources of the device 1000 are used. Thus, the device 1000 may reduce the use of the computing resources for generating the expanded video by inputting only some frames (e.g., reference frames) of the first video to the expanded video generation module. That is, a utilization rate of a processor, a graphics processing unit (GPU, or neural processing unit (NPU)), or a memory (e.g., buffer memory) of the device 1000 may be reduced. Also, power consumption of the device 1000 for generating the expanded video may be reduced.

The first video may be composed of a plurality of reference frames. The device 1000 may generate a plurality of expanded videos and second videos respectively corresponding to the plurality of reference frames by inputting the respective reference frames to the expanded video generation module. For example, the expanded video generation module may generate a plurality of expanded videos respectively corresponding to the plurality of reference frames in response to the respective inputs of the plurality of reference frames. The device 1000 may generate the second video by combining the plurality of reference frames and expanded videos respectively corresponding thereto. In another example, the expanded video generation module may generate a second video in which the plurality of reference frames are respectively combined with the plurality of expanded videos corresponding thereto in response to the respective inputs of the plurality of reference frames.

According to various embodiments, the AI neural network (or, trained model) may include a generative adversarial network (GAN). The GAN model may include, for example, a generator and a discriminator. In this case, the device 1000 may generate an expanded video by inputting the first video to a generator.

Referring to operation S470, the device 1000 may display the second video including at least one portion of the first video and the expanded video in the first area. For example, the device 1000 may display the second video including the reference frame and the expanded video corresponding to the reference frame in the first area.

According to an embodiment, the reference frame may be one or more in number, and the first video may be composed of a plurality of reference frames. Also, the expanded video may be provided plural in number. In this case, the plurality of expanded videos may be generated to respectively correspond to the plurality of reference frames by inputting the plurality of reference frames to the expanded video generation module. The second video may be a video in which the plurality of reference frames are respectively combined with the expanded videos respectively corresponding to the plurality of reference frames.

Figure 5:
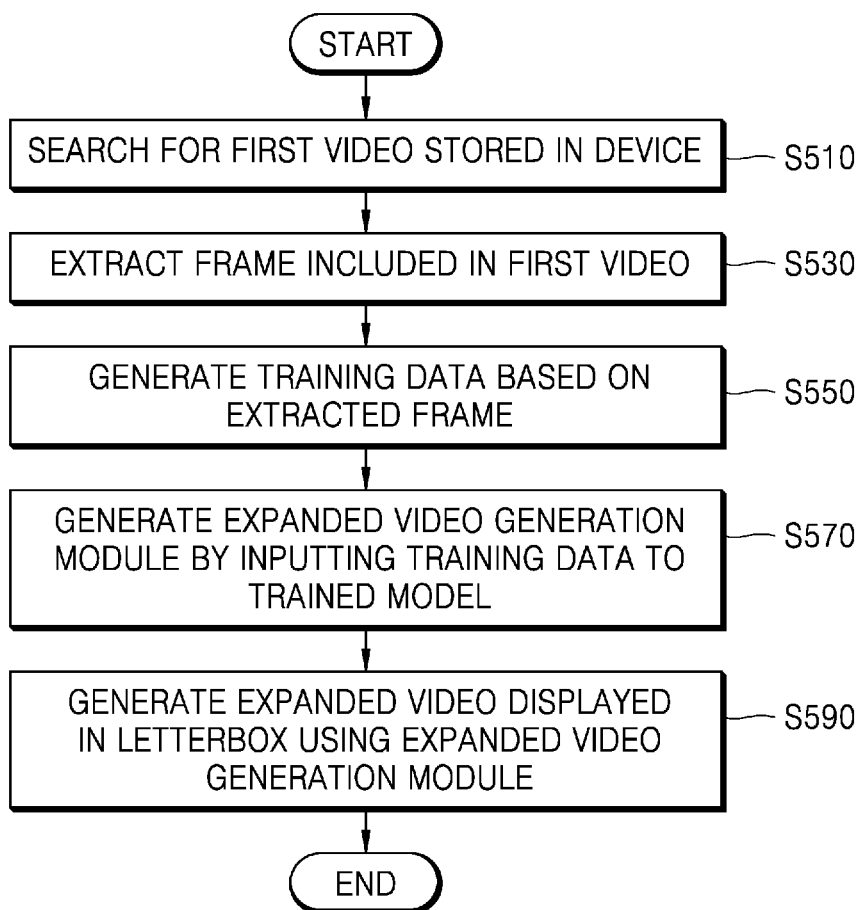
FIG. 5 is a flowchart illustrating a method of generating an expanded video, according to an embodiment.

FIG. 5 is a flowchart illustrating a method of generating an expanded video according to an embodiment.

Referring to FIG. 5, the device 1000 may generate an expanded video by using the AI neural network built in the device 1000. Specifically, the device 1000 may generate training data and train the AI neural network by inputting the generated training data to the AI neural network. The device 1000 may generate the expanded video by inputting the first video to the trained AI neural network.

For example, the expanded video generation module may be generated by using the trained model built in the device 1000. The device 1000 may generate an expanded video by using the generated expanded video generation module.

According to an embodiment, the device 1000 may generate the expanded video generation module and expanded videos corresponding to videos stored in the device 1000 during a time while the user does not use the device 1000.

Referring to operation S510, the device 1000 may retrieve the first video stored in the device 1000. The device 1000 may retrieve videos including the first video stored in the device 1000 during a time while the user does not use the device 1000.

According to an embodiment, the device 1000 may store retrieval results of the videos in the device 1000. In this case, the device 1000 may store information related to the videos stored in the device 1000. For example, the device 1000 may store a path through which a video is stored in a memory 1700, a play time of the video, an aspect ratio of the video, whether an expanded video has been generated, and the like in the device 1000.

Referring to operation S530, the device 1000 may extract at least one frame included in the first video. That is, the device 1000 may generate an expanded video generation module corresponding to the first video by inputting all frames included in the first video. Alternatively, the device 1000 may generate the expanded video generation module corresponding to the first video by inputting some frames (e.g., reference frames) among the frames included in the first video.

The device 1000 may extract at least one frame included in the first video during a time while the user does not use the device 1000.

According to an embodiment, the device 1000 may extract the reference frame included in the first video. In this case, the reference frame is a frame selected as necessary to generate the expanded video. The reference frame may include a frame required to generate expanded videos corresponding to a plurality of frames constituting a segment of the first video. The reference frame may be one or more.

For example, the reference frame may be an intra-frame. The reference frame may be a frame to be decoded by a decoder by referring to the intra-frame.

In another example, the reference frame may be a frame the most similar to the other frames among the plurality of frames constituting a segment of the first video. Specifically, the reference frame may be a first frame among the plurality of frames constituting the segment. Alternatively, the reference frame may be an intermediate frame among the plurality of frames. Alternatively, the reference frame may be a frame including the largest number of pixels identical to those of the other pixels among the plurality of frames.

When the device 1000 update the trained model by applying training data to the trained model, a lot of computing resources of the device 1000 are used. Thus, by inputting only some frames (e.g., reference frames) of the first video to the trained model as training data, the device 1000 may reduce the use of the computing resources for updating the trained model. That is, a utilization rate of a processor, a GPU (or NPU), or a memory (e.g., buffer memory) of the device 1000 may be reduced. Also, power consumption of the device 1000 for updating the trained model may be reduced.

Referring to operation S550, the device 1000 may generate training data based on the extracted frame. The device 1000 may generate training data during a time while the user does not use the device 1000.

For example, the device 1000 may generate all frames of the first video as training data.

In another example, the device 1000 may generate the extracted reference frame and at least one previous frame played before the reference frame as training data. In another example, the device 1000 may generate the reference frame and at least one next frame played after the reference frame as training data. In another example, the device 1000 may generate the reference frame and a resized frame obtained by resizing the reference frame as training data. In another example, the device 1000 may generate, as training data, a reference frame by applying a weight to preset pixels located at edges of the reference frame. In another example, the device 1000 may generate the reference frame and a crop frame obtained by cropping a portion of the reference frame as training data. In another example, the device 1000 may generate the reference frame and an image related to the reference frame as training data. In this case, the image related to the reference frame may be an image related to at least one of a pattern and a color constituting the reference frame. The image related to the reference frame may be an image obtained through Internet search. In another example, the device 1000 may generate the reference frame, the image related to the reference frame, and the resized image obtained by resizing the image related to the reference frame as training data. The training data applied to the trained model is not limited thereto.

The training data will be described below with reference to FIGS. 9 to 15.

Referring to operation S570, the device 1000 may generate an expanded video generation module by inputting training data to the trained model. The device 1000 may generate the expanded video generation module during a time while the user does not use the device 1000. The device 1000 may refine the generated expanded video generation module by applying training data to the trained model.

According to an embodiment, the device 1000 may generate the expanded video generation module by applying training data described above in operation S550 to the trained model built in the device 1000. For example, the device 1000 may input the trained model and training data to the learner and control the learning to generate (or refine) the expanded video generation module by updating the trained model using the training data. In this case, the generated expanded video generation module may be a dedicated module for displaying the first video in the first area. According to an embodiment, the way of applying the training data to the trained model may be determined according to training performed based on a preset standard. For example, supervised learning, unsupervised learning, and reinforcement learning may be used to apply the training data to the trained model, and deep neural network technology may also be used therefor.

Referring to operation S590, the device 1000 may generate an expanded video using the expanded video generation module. The device 1000 may generate an expanded video by inputting the first video to the expanded video generation module during a time while the user does not use the device 1000.

According to an embodiment, the device 1000 may extract a reference frame included in the first video and input the extracted reference frame to the expanded video generation module, thereby generating an expanded video corresponding to the reference frame. In this case, the reference frame is a frame selected as necessary to generate the expanded video. The reference frame may be one or more in number, and the first video may include a plurality of reference frames. Also, the expanded video may be plural in number. In this case, the plurality of expanded videos may be generated to respectively correspond to the plurality of reference frames by inputting the plurality of reference frames to the expanded video generation module. The method of generating an expanded video by inputting the reference frame to the expanded video generation module is described above with reference to FIG. 4, and thus duplicate descriptions will be omitted.

According to an embodiment, the device 1000 may display a second video generated by combining the reference frames with the expanded videos corresponding to the reference frames in the first area. In this case, the second video may be a video in which the plurality of reference frames are respectively combined with the plurality of expanded videos respectively corresponding to the plurality of reference frames. The method of displaying the second video is described above with reference to FIG. 4, and thus duplicate descriptions will be omitted.

Figure 6:
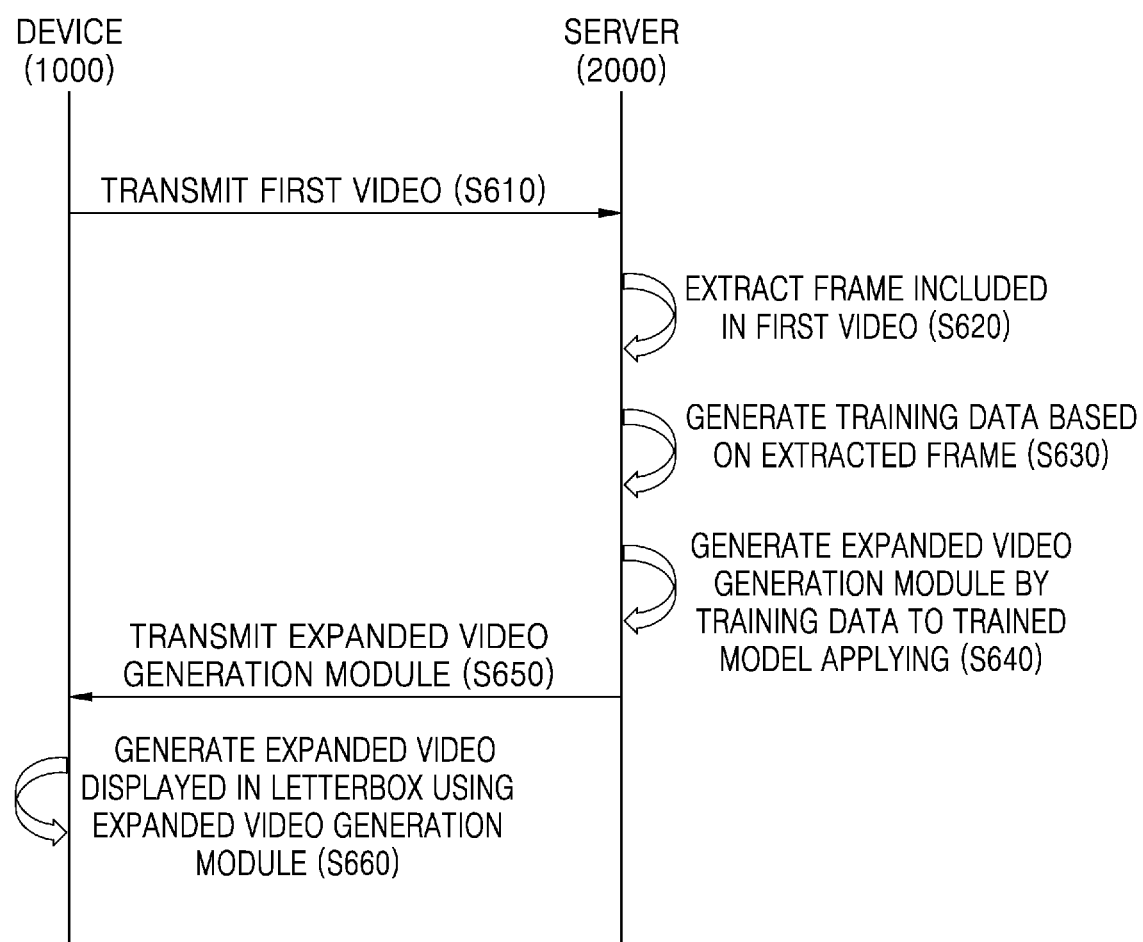
FIG. 6 is a flowchart illustrating a method of generating an expanded video by using a server, according to an embodiment.

FIG. 6 is a flowchart illustrating a method of generating an expanded video by using a server 2000 according to an embodiment.

Referring to FIG. 6, the device 1000 may generate an expanded video using the AI neural network built in the server 2000. The device 1000 may receive the AI neural network from the server 2000 and generate an expanded video by using the received AI neural network. In addition, the device 1000 may receive a refined AI neural network from the server 2000.

For example, the device 1000 may receive an expanded video generation module generated by a trained model built in the server 2000 from the server 2000. In addition, the device 1000 may receive the refined expanded video generation module by applying training data to the trained model built in the server 2000.

Referring to operation S610, the device 1000 may transmit the first video to the server 2000.

According to an embodiment, the device 1000 may transmit at least one portion of the first video stored in the device 1000 to the server 2000.

For example, the device 1000 may transmit at least one frame extracted from the first video to the server 2000. That is, the device 1000 may transmit all frames stored in the first video to the server 2000. Alternatively, the device 1000 may transmit some frames (e.g., reference frames) stored in the first video to the server 2000. The reference frame is a frame selected as necessary to generate the expanded video generation module. The reference frame may include frames required to generate expanded videos corresponding to a plurality of frames constituting a segment of the first video. The reference frame is described above with reference to FIG. 5, and thus duplicate descriptions will be omitted.

A lot of network resources are used when the device 1000 transmits the first video to the server 2000. Thus, by transmitting only some frames (e.g., reference frames) of the first video to the server 2000, the device 1000 may reduce an amount of data transmission. Also, power consumption of the device 1000 for transmitting the first video to the server 2000 may be reduced.

In another example, the device 1000 may transmit a crop image obtained by cropping a portion of the first video to the server 2000.

According to an embodiment, the device 1000 may transmit information about the first video posted on the Internet to the server 2000. For example, the device 1000 may transmit an identifier (e.g., URL) of the first video to the server 2000. In another example, the device 1000 may transmit at least one frame extracted from the first video to the server 2000. In another example, the device 1000 may transmit a video composed of a plurality of reference frames extracted from the first video.

Referring to operation S620, the server 2000 may extract a frame included in the received first video.

According to an embodiment, the server 2000 may extract a reference frame included in the first video. In this case, the reference frame is a frame selected as necessary to generate the expanded video generation module. The reference frame may include frames required to generate the expanded video corresponding to a plurality of frames constituting a segment of the first video. The reference frame is described above with reference to FIG. 5, and thus duplicate descriptions will be omitted. Also, the server 2000 may extract at least one previous frame played before the reference frame. In addition, the server 2000 may extract at least one next frame played after the reference frame.

According to an embodiment, the server 2000 may omit the extracting of the reference frame from the first video when the reference frame is received from the device 1000.

Referring to operation S630, the server 2000 may generate training data based on the extracted frames.

For example, the server 2000 may generate an extracted reference frame as training data. In another example, the server 2000 may generate the extracted reference frame and the at least one previous frame played before the reference frame as training data. In another example, the server 2000 may generate a reference frame and at least one next frame played after the reference frame as training data. In another example, the server 2000 may generate a reference frame and a resized frame obtained by resizing the reference frame as training data. In another example, the server 2000 may generate, as training data, a reference frame by applying a weight to preset pixels located at edges of the reference frame. In another example, the server 2000 may generate a reference frame and a crop frame obtained by cropping a portion of the reference frame as training data. In another example, the server 2000 may generate the reference frame and an image related to the reference frame as training data. In this case, the image related to the reference frame may be an image related to at least one of a pattern and a color constituting the reference frame. The image related to the reference frame may be an image obtained through Internet search. In another example, the device 1000 may generate a reference frame, an image related to the reference frame, and a resized image obtained by resizing the image related to the reference frame as training data. The training data applied to the trained model is not limited thereto.

The training data will be described below with reference to FIGS. 9 to 15.

Referring to operation S640, the server 2000 may generate an expanded video generation module by applying the training data to the trained model. In addition, the server 2000 may refine the generated expanded video generation module by applying training data to the trained model.

According to an embodiment, the server 2000 may generate the expanded video generation module by applying training data described in operation S630 to the trained model. For example, the server 2000 may control the learning model to generate (or refine) the expanded video generation module by inputting the trained model and training data to the learning model and updating the trained model using the training data. In this case, the generated expanded video generation module may be a dedicated module for displaying the first video in the first area. the way of applying the training data to the trained model may be determined according to training performed based on a preset standard. For example, supervised learning, unsupervised learning, and reinforcement learning may be used to apply the training data to the trained model, and deep neural network technology may also be used therefor.

Referring to operation S650, the server 2000 may transmit the generated expanded video generation module to the device 1000. In this case, the transmitted expanded video generation module may be a dedicated module for displaying the first video in the first area.

According to an embodiment, the server 2000 may transmit the expanded video generation module to the device 1000 during a time while the user does not use the device 1000.

According to an embodiment, the server 2000 may transmit the expanded video generation module to the device 1000 in the case where the user requests for transmission of the expanded video generation module to the device 1000.

According to an embodiment, the server 2000 may transmit the expanded video generation module to the device 1000 in the case where the device 1000 displays the first video.

Referring to operation S660, the device 1000 may generate an expanded video by using the expanded video generation module received from the server. The device 1000 may generate an expanded video by inputting the first video to the expanded video generation module during a time while the user does not use the device 1000.

That is, by inputting all frames included in the first video to the expanded video generation module, the device 1000 may generate expanded videos and second videos respectively corresponding to all frames of the first video. Alternatively, by inputting some frames (e.g., reference frames) included in the first video to the expanded video generation module, the device 1000 may generate expanded videos and second videos respectively corresponding to all frames of the first video.

According to an embodiment, the device 1000 may extract a reference frame included in the first video and input the extracted reference frame to the expanded video generation module, thereby generating an expanded video corresponding to the reference frame. In this case, the reference frame may be one or more in number, and the first video may be composed of a plurality of reference frames. Also, the expanded video may be plural in number. In this case, the plurality of expanded videos may be generated to respectively correspond to the plurality of reference frames by inputting the plurality of reference frames to the expanded video generation module. The method of generating an expanded video by inputting the reference frame to the expanded video generation module is described above with reference to FIG. 4, and thus duplicate descriptions will be omitted.

According to an embodiment, the device 1000 may display a second video generated by combining the reference frames with the expanded videos corresponding to the reference frames in the first area. In this case, the second video may be a video in which a plurality of reference frames are combined with a plurality of expanded videos respectively corresponding to the plurality of reference frames.

Figure 7:
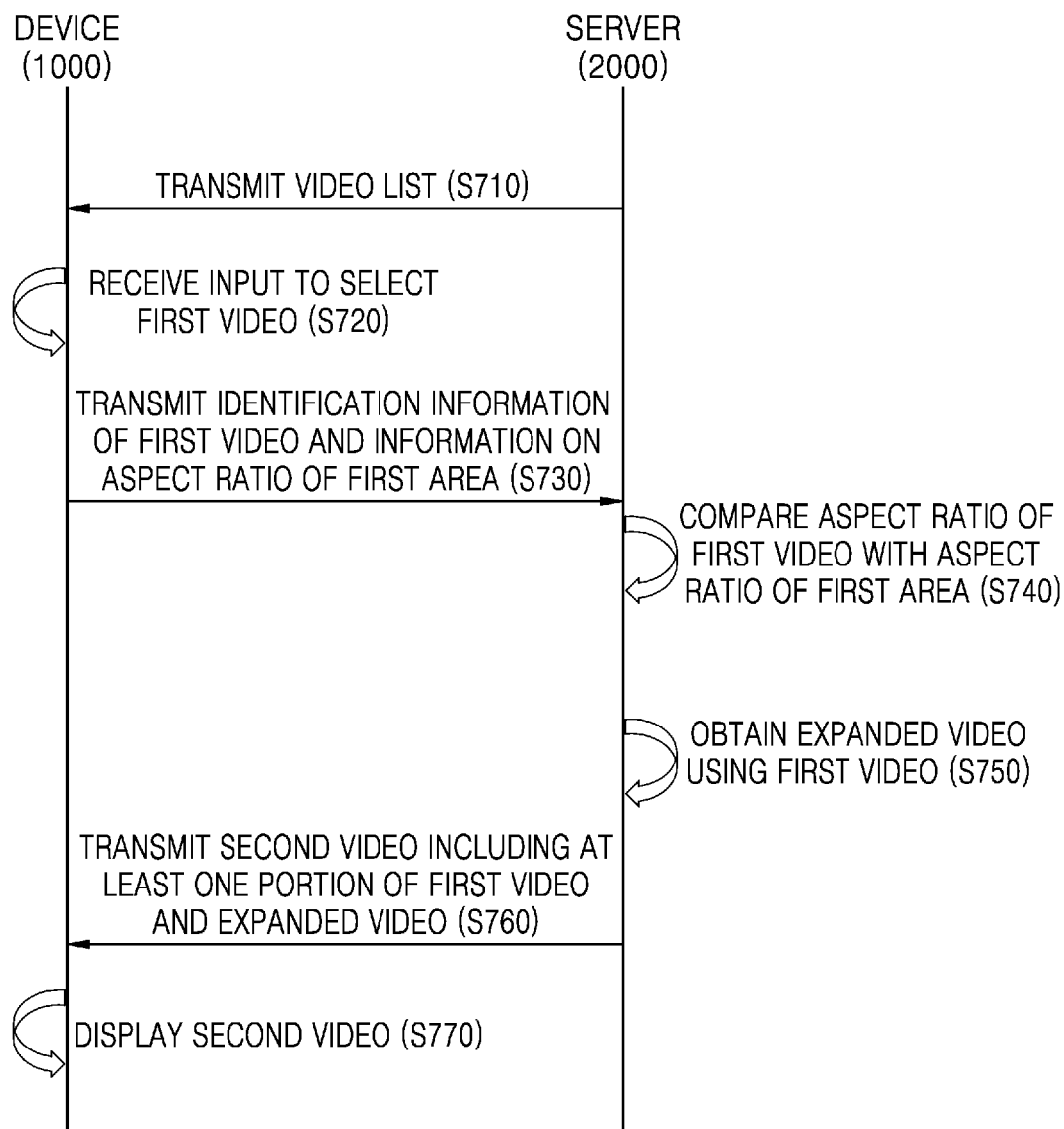
FIG. 7 is a flowchart illustrating a method of controlling a device for displaying a video including an expanded video using the server, according to an embodiment.

FIG. 7 is a flowchart illustrating a method of controlling a device for displaying a video including an expanded video using the server 2000 according to an embodiment.

Referring to FIG. 7, the device 1000 may receive a second video generated by the server 2000 and including the first video and an expanded video corresponding to the first video. The device 1000 may display the received second video on a screen. In this case, the expanded videos 3020*a* and 3020*b* corresponding to the first video may be videos generated by an AI neural network built in the server 2000.

For example, the expanded videos 3020*a* and 3020*b* corresponding to the first video may be generated by inputting at least one frame of the first video to the expanded video generation module generated by the trained model built in the server 2000.

Referring to operation S710, the server 2000 may transmit a video list to the device 1000. The video list refers to a list of videos that may be transmitted to the device 1000 by the server 2000.

According to an embodiment, the server 2000 may be a server providing a VOD service. In another example, the server 2000 may be a server that provides a service allowing uploading of a video from the user and sharing of the uploaded video.

Meanwhile, the device 1000 may display the received video list on a screen of the device 1000. The video list displayed on the screen of the device 1000 may be a list including at least one frame included in each video as a thumbnail.

Referring to operation S720, the device 1000 may receive a user input to select a first video included in the video list from the user. For example, the device 1000 may receive a user input to select the first video from the user using a screen including a touchscreen. In another example, the device 1000 may receive a user input to select the first video from the user by using an input device such as a remote control, a keyboard, and a mouse.

Referring to operation S730, the device 1000 transmit identification information (e.g., identifier) of the selected first video and information on an aspect ratio of the first area (e.g., 18:9) to the server.

Referring to operation S740, the server 2000 may compare an aspect ratio of the first video (e.g., 16:9) with an aspect ratio of the first area (e.g., 18:9) based on the aspect ratio of the first area received from the device 1000. The server 2000 may identify whether the aspect ratio of the first video is different from the aspect ratio of the first area. For example, when the aspect ratio of the first video is 16:9 and the aspect ratio of the first area is 18:9, the server 2000 may determine that the aspect ratio of the first video is different from the aspect ratio of the first area. In another example, when the aspect ratio of the first video is 16:9 and the aspect ratio of the first area is 16:9, the server 2000 may determine that the aspect ratio of the first video is not different from the aspect ratio of the first area.

Referring to operation S750, the server 2000 may generate an expanded video by using the first video.

According to an embodiment, because the aspect ratio of the first video is different from the aspect ratio of the first area, the server 2000 may generate an expanded video to be displayed in a letterboxed area when the first video is displayed in the first area.

The server 2000 may identify the letterboxed area and generate an expanded video to be displayed in the letterboxed area. For example, when the aspect ratio of the first video is 16:9 and the aspect ratio of the first area is 18:9, the device 1000 may identify letterboxed areas located at portions in the vicinity of left and right sides of the first video. In another example, when the aspect ratio of the first video is 2.35:1 and the aspect ratio of the first area is 16:9, the device 1000 may identify letterboxed areas located at portions in the vicinity of top and bottom sides of the first video.

According to an embodiment, the server 2000 may generate an expanded video and a second video by inputting at least one frame included in the first video to an AI neural network. In this case, the second video may include at least one portion of the first video and the expanded video.

For example, the server 2000 may generate an expanded video by inputting at least one frame included in the first video to the expanded video generation module. Specifically, the server 2000 may generate an expanded video corresponding to the reference frame by inputting reference frame included in the first video to the expanded video generation module. In this case, the reference frame may be one or more. The first video may be composed of a plurality of reference frames.

The server 2000 may generate a plurality of expanded videos respectively corresponding to the plurality of reference frames by inputting the respective reference frames to the expanded video generation module. The method of generating the expanded videos by inputting the reference frame to the expanded video generation module is described above with reference to FIG. 4, and thus duplicate descriptions will be omitted.

Referring to operation S760, the server 2000 may transmit a second video including at least one portion of the first video and the expanded video to the device 1000.

According to an embodiment, the server 2000 may transmit the second video to the device 1000 during a time while the user does not use the device 1000.

According to an embodiment, the server 2000 may transmit the second video to the device 1000 in the case where the user requests for transmission of the second video to the device 1000.

According to an embodiment, the server 2000 may transmit the second video to the device 1000 in the case where the device 1000 displays the second video.

Referring to operation S770, the device 1000 may display the second video including at least one portion of the first video and the expanded video in the first area. For example, the device 1000 may display the second video including the reference frame and the expanded video corresponding to the reference frame in the first area.

According to an embodiment, the reference frame may be one or more in number, and the first video may be composed of a plurality of reference frames. Also, the expanded video may be plural in number. In this case, the plurality of expanded videos may be generated to respectively correspond to the plurality of reference frames by inputting the plurality of reference frames to the expanded video generation module. The second video may be a video in which a plurality of reference frames are combined with the plurality of expanded videos respectively corresponding to the plurality of reference frames.

Figure 8:
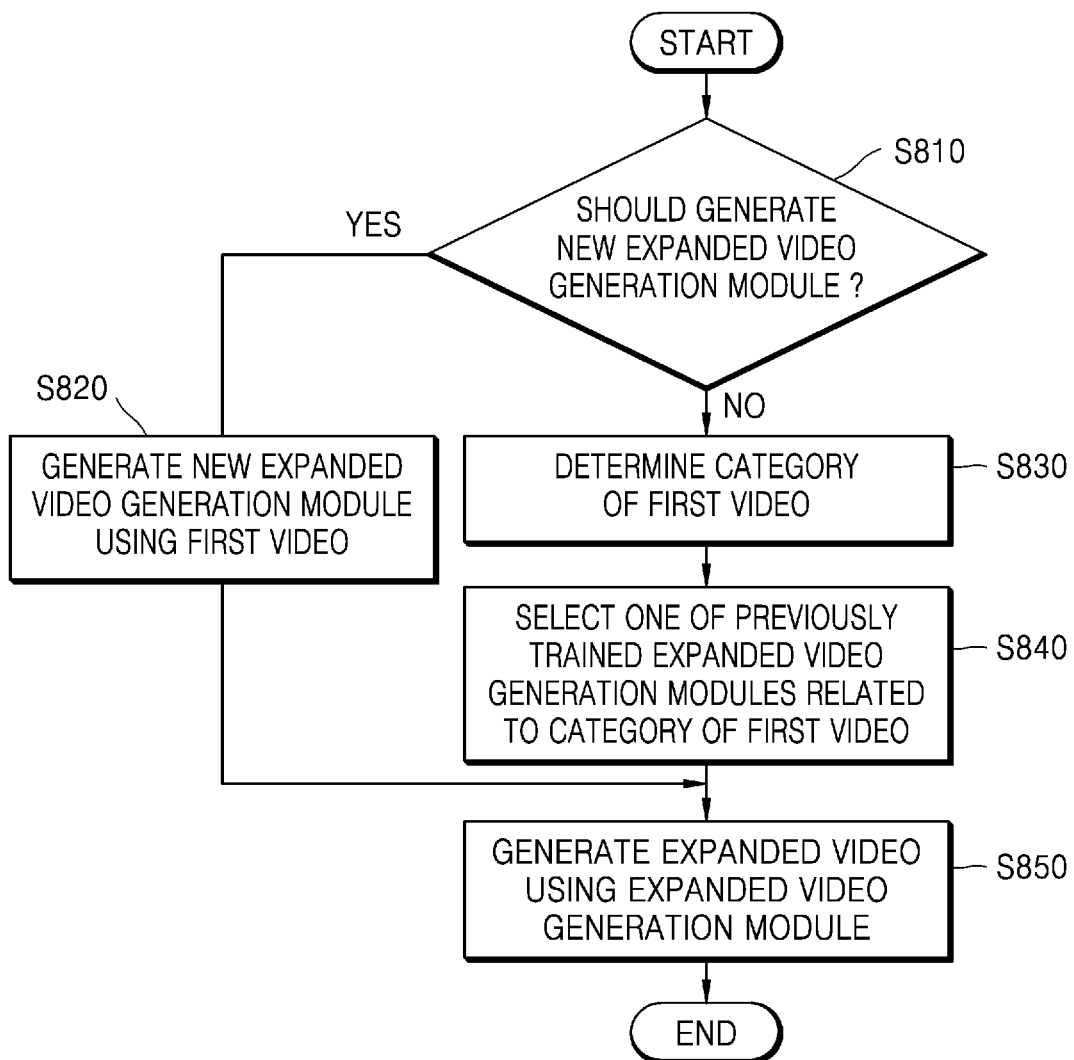
FIG. 8 is a flowchart illustrating a method of generating or selecting an expanded video, according to an embodiment.

FIG. 8 is a flowchart illustrating a method of generating or selecting an expanded video according to an embodiment. Embodiments disclosed with reference to FIG. 8 may be performed by a processor of the device 1000 or a processor of the server 2000. That is, the processor which will be described below may be at least one of a processor of the device 1000 and a processor of the server 2000. The processor may include a graphics processing unit (GPU) or a neural-network processing unit (NPU).

Referring to FIG. 8, the processor may compare an aspect ratio of the first video with an aspect ratio of a screen included in a display on which the first video is to be played back. The display may include a flexible display having a variable aspect ratio of a screen on which the first video is output by folding or unfolding as at least one portion thereof. The processor may compare the aspect ratio of the first video with the aspect ratio of the screen modified by folding or unfolding at least one portion thereof. The processor may compare the aspect ratio of the first video with the modified aspect ratio of the screen whenever the aspect ratio of the screen is changed.

The processor may determine whether to generate a new expanded video generation module corresponding to the first video based on a comparison result (S810). The processor may input the first video to a trained model 4000 such that the trained model 4000 generates a new expanded video generation module by using the first video (S820). Alternatively, the processor determines a category of the first video (S830) and selects one of previously trained expanded video generation modules related to the determined category (S840). The processor may generate an expanded video by using the expanded video generation module.

Referring to operation S810, the processor may determine whether to generate a new expanded video generation module corresponding to the first video. The processor may compare the aspect ratio of the first video with the aspect ratio of the screen on which the first video is to be displayed. When the aspect ratio of the first video is different from the aspect ratio of the screen, the processor may identify whether an expanded video generation module corresponding to the first video exists. The previously generated expanded video generation module may be plural in number. The previously generated expanded video generation module may be stored in a memory of the device 1000 or a database DB of the server 2000. The processor may identify whether the expanded video generation module corresponding to the first video exists among a plurality of expanded video generation modules.

According to an embodiment, the processor may determine whether to generate a new expanded video generation module based the existence of the expanded video generation module corresponding to the first video. For example, when a previously generated expanded video generation module corresponding to the first video exists, the processor may determine not to generate a new expanded video generation module. In another example, when a preset time has elapsed since the expanded video generation module corresponding to the first video is previously generated, the processor may determine to generate a new expanded video generation module. In another example, when the previously generated expanded video generation module corresponding to the first video is not configured to match an aspect ratio of an area where the first video is to be displayed, the processor may determine to generate a new expanded video generation module. The previously generated expanded video generation module may be stored in the memory of the device 1000 and the DB of the server 2000. The processor may determine whether to generate a new expanded video generation module based on header information of the previously generated expanded video generation module. The header information may include information about a video corresponding to the expanded video generation module (e.g., a path where the video is stored, a play time of the video, an aspect ratio of the video, and information on whether an expanded video has been generated), information about a generation time of the expanded video generation module, and information about a category of the first video.

According to an embodiment, the processor may determine whether to generate a new expanded video generation module based on the existence of the expanded video generation module corresponding to a video similar to the first video.

For example, when the expanded video generation module corresponding to the category (e.g., a SF movie, a documentary on nature, a live performance, a 2D animation, a 3D animation, an augmented reality (AR) video, a hologram video, and the like) of the first video exists, the processor may not generate a new expanded video generation module.

In another example, the processor may not generate a new expanded video generation module in the case where an expanded video generation module corresponding to a video having a similar name to that of the first video exists.

In another example, the processor may not generate a new expanded video generation module in the case where an expanded video generation module corresponding to a video including a frame similar to at least one frame of the first video exists. Referring to operation S820, the processor may input the first video to the trained model 4000 such that the trained model 4000 generates a new expanded video generation module corresponding to the first video by using the first video. The trained model 4000 may generate a new expanded video generation module by learning at least one piece of training data related to the first video. The processor may control the trained model 4000 to learn via at least one of a GPU and a NPU. For example, the device 1000 may input the trained model 4000 and the first video to the learner and control the learner to update the trained model 4000 using the first video and generate a new expanded video generation module corresponding to the first video. Training data for generating an expanded video generation module corresponding to the first video will be described below in detail with reference to FIGS. 9 to 15.

Referring to operation S830, the processor may determine the category (e.g., a SF movie, a documentary on nature, a live performance, a 2D animation, a 3D animation, an augmented reality (AR) video, a hologram video, and the like) of the first video to select an expanded video generation module corresponding to the first video.

According to an embodiment, the processor may determine the category of the first video based on metadata of the first video. For example, the processor may determine the category of the first video based on header information of the first video. In another example, the processor may determine the category of the first video based on a name of the first video.

According to an embodiment, the processor may determine the category of the first video based on at least one frame included in the first video. Specifically, because the SF movie may include at least one frame related to the universe, the processor may determine that the category of the first video as an SF movie by determining the at least one frame included in the first video as a frame related to the universe. In addition, because the documentary on nature may include at least one frame related to nature such as forest, desert, and ocean, the processor may determine the category of the first video as a documentary on nature by determining the at least one frame included in the first video as a frame related to nature.

According to an embodiment, the processor may determine the category of the first video by recognizing an object included in at least one frame of the first video. Specifically, when the object of the first video is a 2D animation character, the processor may determine the category of the first video as a 2D animation.

Referring to operation S840, the processor may select one of the previously generated expanded video generation modules related to the category of the first video.

According to an embodiment, the processor may store information on the previously generated expanded video generation module on the basis of category. The information about the previously generated expanded video generation module may include information on a category of the video corresponds and information on a scene of the video used to generate the expanded video generation module.

For example, the processor may determine the category of the first video as a documentary on nature. The processor may select an expanded video generation module generated to correspond to a documentary video on nature among the previously generated expanded video generation modules. In addition, the processor may select an expanded video generation module generated to correspond to a scene of fishing in the sea.

In another example, the processor may determine the category as an SF movie. The processor may select an expanded video generation module generated to correspond to an SF movie among the previously generated expanded video generation modules. In addition, the processor may select an expanded video generation module generated to correspond to a scene of a spaceship moving through the space.

According to an embodiment, the processor may select one of the previously generated expanded video generation modules based on at least one frame of the first video. For example, the at least one frame of the first video may be a frame constituting a scene in which a fishing boat is moving in the sea. The processor may select an expanded video generation module generated to correspond to the scene of fishing in the sea. The processor may select an expanded video generation module generated to correspond to a scene in which a boat is moving in the sea.

Referring to operation S850, the processor may generate at least one of the expanded video and the second video by inputting the first video to the expanded video generation module newly generated in operation S820. The processor may generate at least one of the expanded video and the second video by inputting the first video to the expanded video generation module selected in operation S840. The processor may generate an expanded video from the expanded video generation module to which the first video is input via at least one of the GPU and the NPU. The processor may generate a second video by combining the first video with the expanded video via at least one of the GPU and the NPU. A method of generating at least one of the expanded video and the second video is similar to operations S450, S590, and S660, and thus duplicate descriptions will be omitted.

Figure 9:
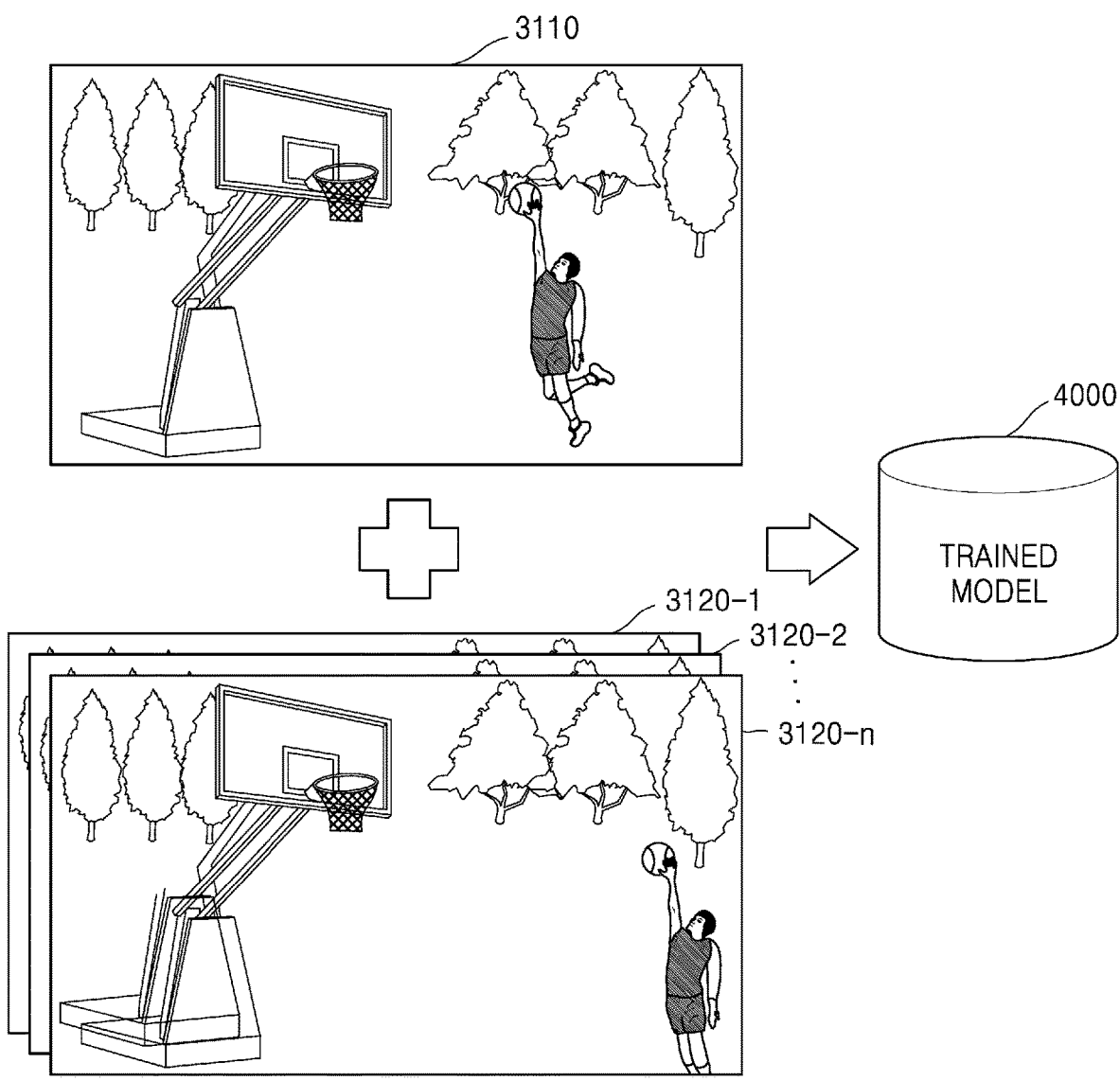
FIGS. 9 and 10 are diagrams illustrating examples of inputting a frame included in a video to a trained model, according to an embodiment.
Figure 10:
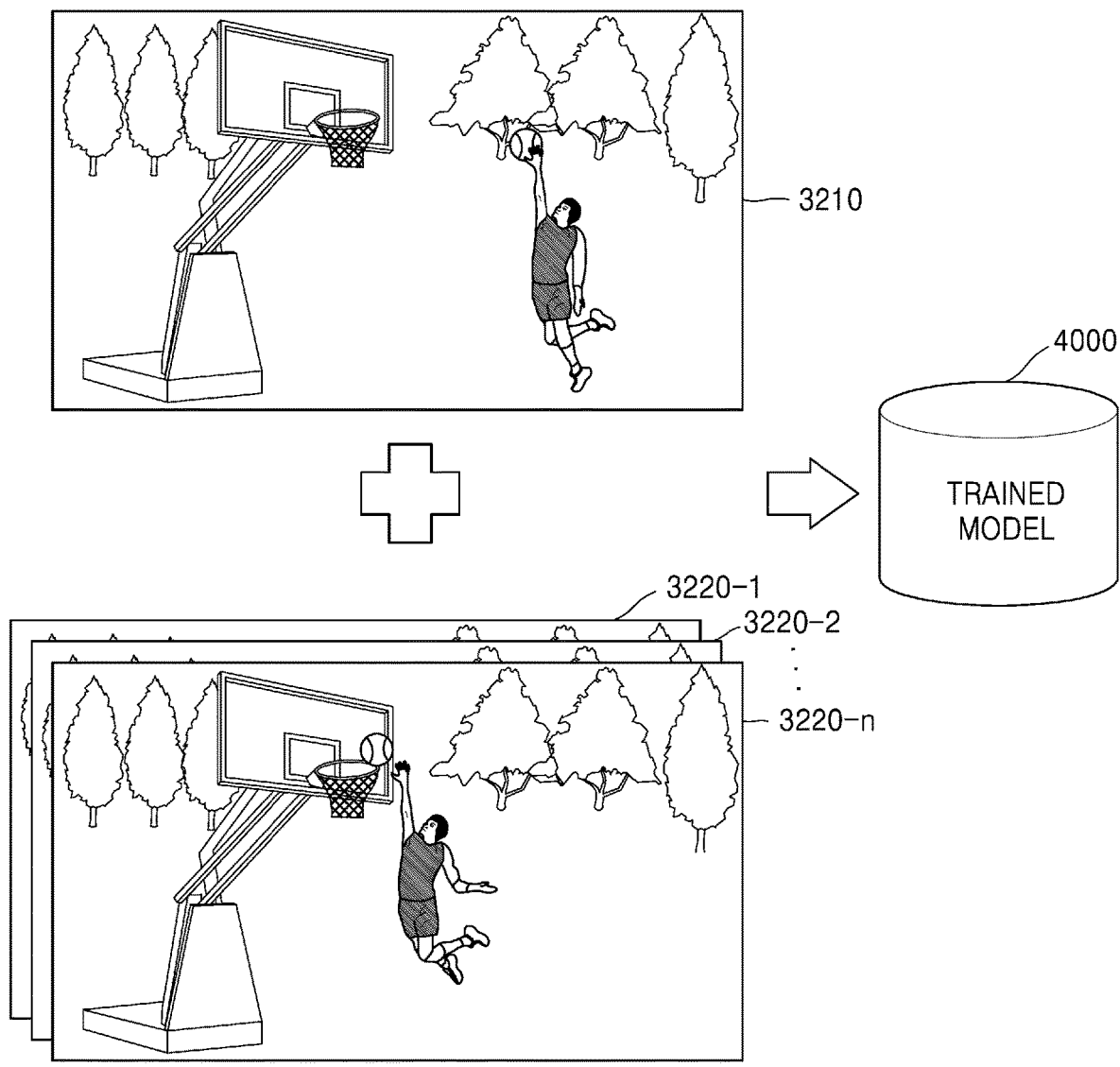

FIGS. 9 and 10 are diagrams illustrating examples of inputting a frame included in a video to a trained model 4000 according to an embodiment.

At least one frame included in the first video may be input to the AI neural network as training data. In addition, the AI neural network may be trained by the input training data to generate an expanded video corresponding to the first video and the a second video. In this regard, the second video may include the first video and an expanded video corresponding to the first video.

Referring to FIG. 9, a reference frame 3110 included in the video and at least one of previous frame 3120-1, 3120-2, and 3120-n played back temporally before the reference frame 3110 may be input to the trained model 4000 as training data.

Referring to FIG. 10, a reference frame 3210 included in the video and at least one of next frames 3220-1, 3220-2, and 3220-n played back temporally after the reference frame 3210 may be input to the trained model 4000 as training data.

In addition, it is obvious that the reference frame 3210, the at least one of the previous frame 3120-1, 3120-2, and 3120-n, and the at least one of the next frames 3220-1, 3220-2, and 3220-n may be input to the trained model 4000 as training data.

Referring to FIGS. 9 and 10, a person in a video may move from right to left while the video is played back. As the person in the video moves from right to left, a background that may be located in the vicinity of the right side of a reference frame 3110 may be included in the previous frames 3120-1, 3120-2, and 3120-n. In addition, as the person in the video moves from right to left, a background that may be located in the vicinity of the left side of a reference frame 3210 may be included in the next frames 3220-1, 3220-2, and 3220-n. Thus, at least one of the previous frames 3120-1, 3120-2, and 3120-n and the next frames 3220-1, 3220-2, and 3220-n may be input, as training data, to the trained model 4000 to generate the expanded video generation module.

According to an embodiment, the previous frames 3120-1, 3120-2, and 3120-n and the next frames 3220-1, 3220-2, and 3220-n may be frames played back before and after a preset time period from the reference frames 3110 and 3210, respectively. In addition, the previous frames 3120-1, 3120-2, and 3120-n and the next frames 3220-1, 3220-2, and 3220-n may be frames having similarity to the reference frames 3110 and 3210, respectively. In this case, the similarity may be based on an amount of data change between the reference frame 3110 and the previous frames 3120-1, 3120-2, and 3120-$n$ or an amount of data change between the reference frame 3210 and the next frames 3220-1, 3220-2, and 3220-$n$.

The trained model 4000 may recognize features such as patterns and colors of the reference frames 3110 and 3210 based on the reference frames 3110 and 3210, the previous frames 3120-1, 3120-2, and 3120-$n$, and the next frames 3220-1, 3220-2, and 3220-$n$. The trained model 4000 may generate an expanded video generation module to generate expanded videos to be displayed in letterboxes displayed at portions in the vicinity of both sides of the reference frame by using the recognized features.

AI though only the case where the letterboxes are displayed at portions in the vicinity of both sides of the video is described above, it is obvious that the embodiment is also be applied to various shapes of letter boxes as shown in FIG. 2.

Figure 11:
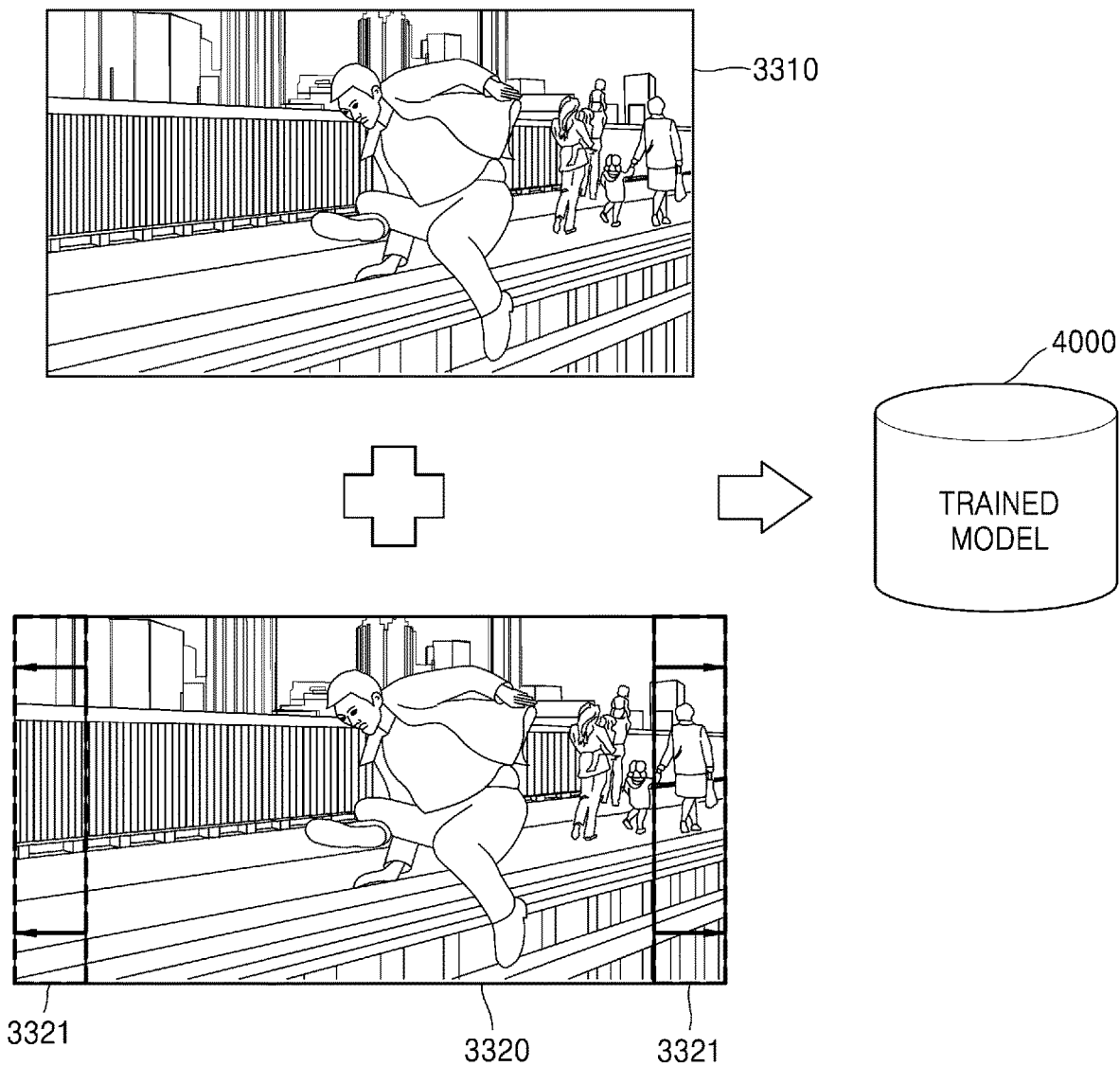
FIG. 11 shows diagrams illustrating examples of inputting a resized image to a trained model, according to an embodiment.

FIG. 11 shows diagrams illustrating examples of inputting a resized image 3320 to a trained model according to an embodiment.

Referring to FIG. 11, a reference frame 3310 included in a video and a resized image 3320 obtained by resizing the reference frame 3310 may be input to the trained model 4000 as training data.

Referring to FIG. 11, the resized image 3320 is an image obtained by resizing the reference frame 3310 such that an aspect ratio of the reference frame 3310 corresponds to an aspect ratio of the first area. The resized image 3320 may have an increased number of pixels 3321 compared to the reference frame 3310.

According to an embodiment, the trained model 4000 may recognize features, such as a pattern and a color, of the reference frame 3310. The trained model 4000 may generate an expanded video generation module to generate expanded videos to be displayed in letterboxes at portions in the vicinity of both sides of the reference frame 3310 by using the recognized features.

The AI neural network may learn the input reference frame 3310 and the resized image 332, thereby generating the expanded video generation module to generate expanded videos without disharmony with the reference frame 3310.

Figure 12:
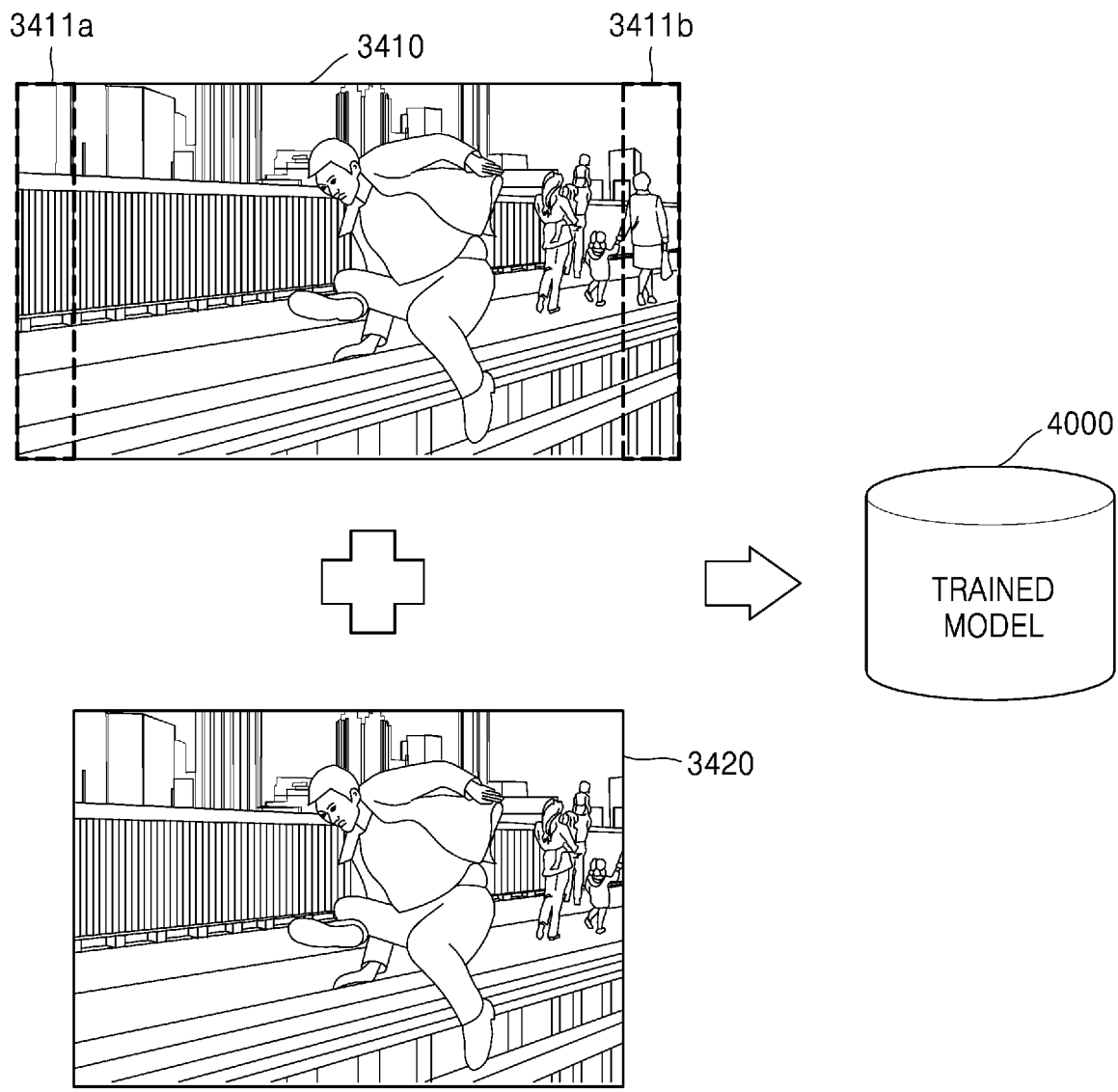
FIG. 12 shows diagrams illustrating examples of inputting a crop image to a trained model, according to an embodiment.

FIG. 12 shows diagrams illustrating examples of inputting a crop image to a trained model according to an embodiment.

Referring to FIG. 12, a reference frame 3410 included in a video and a crop image obtained by cropping the reference frame 3410 may be input to a trained model 4000 as training data. In this case, the crop image 3420 may be an image obtaining by cropping preset pixels 3411$a$ and 3411$b$ of both sides of the reference frame 3410.

According to an embodiment, an aspect ratio of a video may be 2.35:1, and an aspect ratio of the first area may be 18:9. The crop image 3420 may be an image obtained by cropping the preset pixels 3411$a$ and 3411$b$ at both sides of the reference frame 3410 to correspond to the aspect ratio of a screen.

According to an embodiment, the aspect ratio of a video may be 16:9, and the aspect ratio of the first area may be 18:9. The crop image may be an image obtained by cropping preset pixels at both sides of the reference frame corresponding to the aspect ratio of the first area.

According to an embodiment, the trained model 4000 may recognize features, such as a pattern and a color, of the reference frame 3410 based on the reference frame 3410 and the crop image 3420. The trained model 4000 may generate an expanded video generation module to generate expanded videos to be displayed in letterboxes at portions in the vicinity of both sides of the reference frame 3410 by using the recognized features.

The AI neural network may learn the input reference frame 3410 and the crop image 3420, thereby generating the expanded video generation module to generate expanded videos without disharmony with the reference frame 3410.

Figure 13:
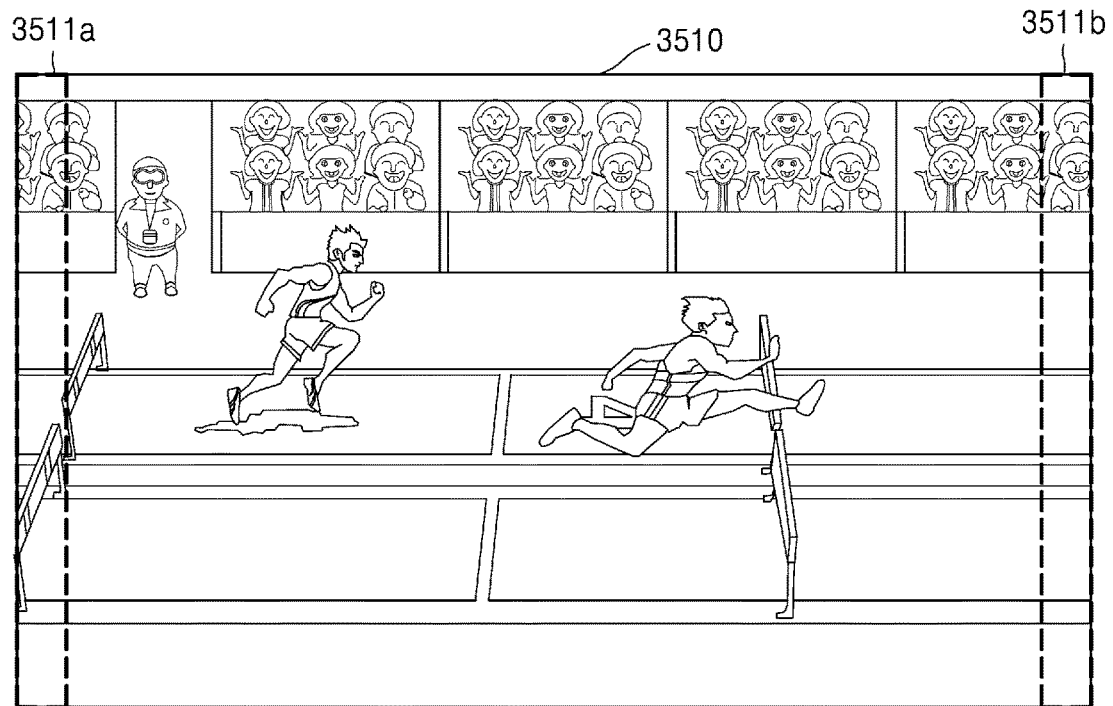
FIG. 13 shows diagrams illustrating examples of applying a weight to frames included in a video, according to an embodiment.
Figure 13:
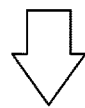
Figure 13:
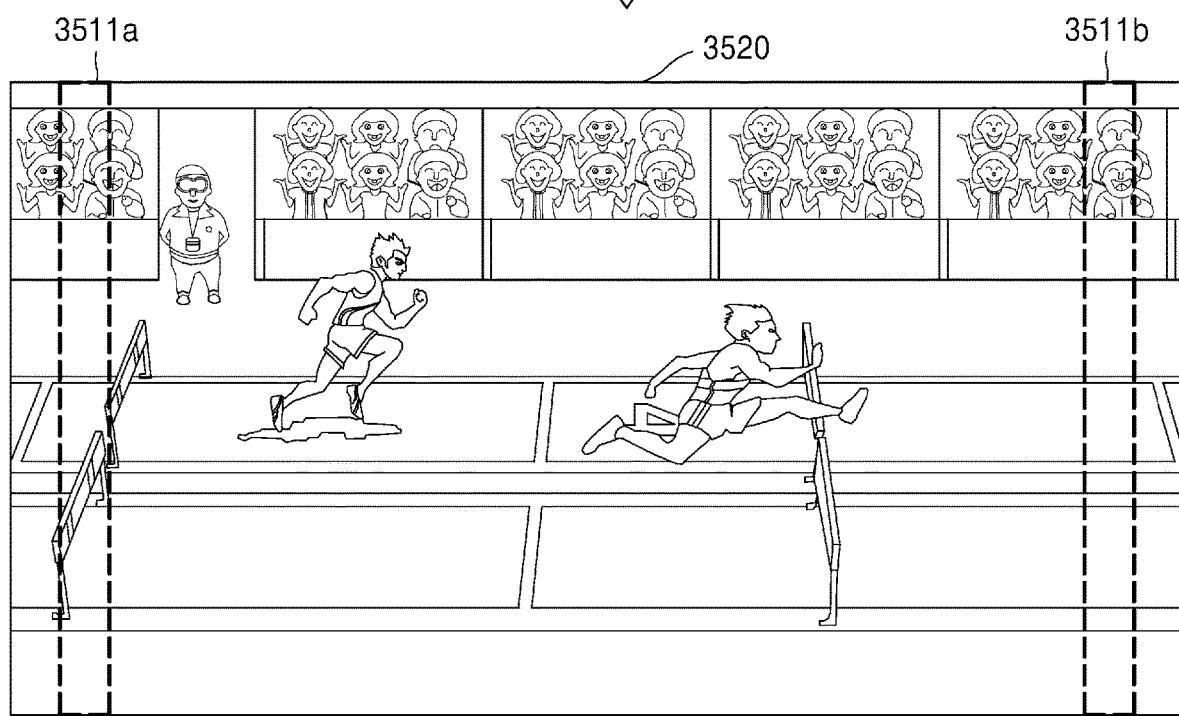

FIG. 13 shows diagrams illustrating examples of applying a weight to frames included in a video according to an embodiment.

Referring to FIG. 13, a weight may be applied to preset pixels 3511$a$ and 3511$b$ of a reference frame 3510 in the video. The reference frame 3510 generated by applying the weight to the preset pixels 3511$a$ and 3511$b$ may be input to the trained model 4000, as training data.

According to an embodiment, the preset pixels 3511$a$ and 3511$b$ to which the weight is applied may be pixels located in the vicinity of letterboxed areas. For example, the aspect ratio of the video may be 16:9, and the aspect ratio of the first area may be 18:9. In this case, the letterboxed areas may be portions in the vicinity of both sides of the video. Thus, the weight may be applied to the preset pixels 3511$a$ and 3511$b$ located at both sides of the reference frame 3510.

According to an embodiment, the trained model 4000 may learn the reference frame 3510 by applying the weight to the preset pixels 3511$a$ and 3511$b$. The trained model 4000 may recognize features, such as patterns and colors, of the preset pixels 3511$a$ and 3511$b$ to which the weight is applied. The trained model 4000 may generate an expanded video generation module to generate expanded videos to be displayed in letterboxes at portions in the vicinity of both sides of the reference frame 3510 by using the recognized features.

Figure 14:
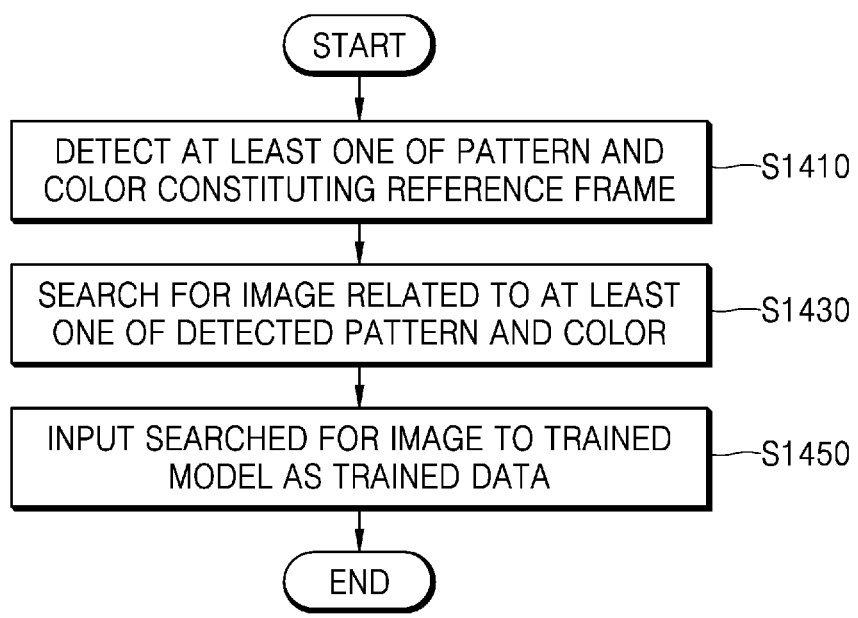
FIG. 14 is a flowchart illustrating a method of inputting a found image to a trained model as training data, according to an embodiment.
Figure 15:
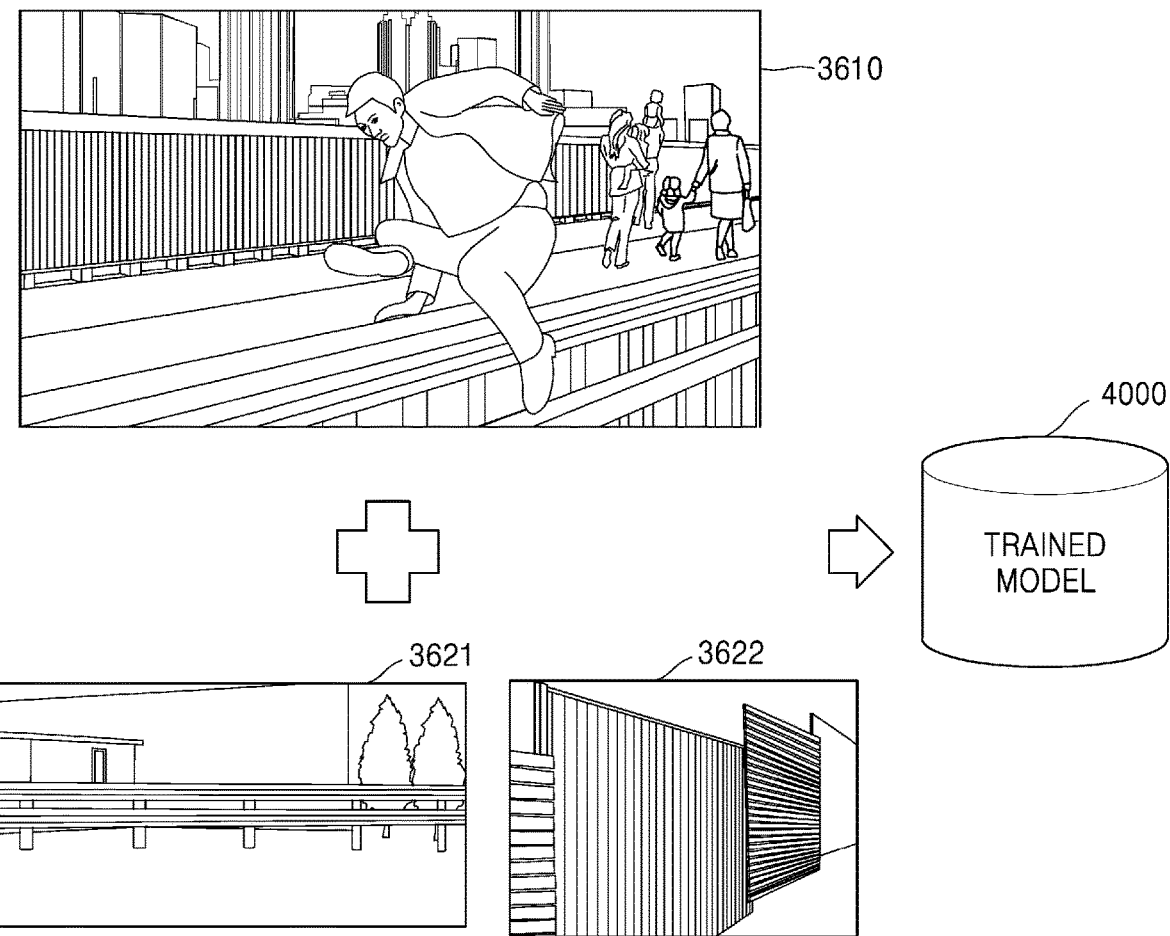
FIG. 15 shows diagrams illustrating examples of inputting found images to a trained model as training data, according to an embodiment.

FIG. 14 is a flowchart illustrating a method of inputting a found image to a trained model as training data according to an embodiment. FIG. 15 shows diagrams illustrating examples of inputting found images to a trained model as training data according to an embodiment.

Referring to FIGS. 14 and 15, the device 1000 or the server 2000 retrieves or searches for an image related to a reference frame and input a searched for image to an AI neural network as training data. The device 1000 or the server 2000 may input the searched for image to the trained model 4000. For example, the device 1000 or the server 2000 may control a learner included in the device 1000 or the server 2000 to update the trained model 4000 by inputting the searched for image to the trained model 4000.

In operation S1410, the device 1000 or the server 2000 may detect at least one of a pattern and a color constituting a reference frame. Referring to FIG. 15, the device 1000 or the server 2000 may detect at least one of a pattern (e.g., vertical lines of a background, horizontal lines of a banister, or the like) and a color (e.g., brown of the background, grey of the banister, or the like) constituting the reference frame.

Referring to operation S1430, the device 1000 or the server 2000 may search for an image related to the detected at least one of the pattern and color. In this case, the device 1000 or the server 2000 may retrieve an image stored in an internal storage (e.g., memory or database). In addition, the device 1000 or the server 2000 may search for an image through the Internet.

Referring to FIG. 15, the device 1000 or the server 2000 may retrieve or search for an image 3621 related to horizontal lines of the banister as a pattern detected from a reference frame 3610. Also, the device 1000 or the server 2000 may retrieve or search for an image 3622 related to vertical lines of the background as a pattern detected from the reference frame 3610.

Referring to operation S1450, the device 1000 or the server 2000 may input the searched for image to the trained model 4000 as training data. Referring to FIG. the device 1000 or the server 2000 may input the searched for images 3621 and 3622, as training data, to the trained model 4000 together with the reference frame 3610.

According to an embodiment, the device 1000 or the server 2000 may generate a resized image by resizing the searched for image and input the generated resized image to the trained model 4000 as training data.

According to an embodiment, the trained model 4000 may learn the reference frame 3610 and the searched for images 3621 and 3622. The trained model 4000 may recognize features, such as pattern or color, of the reference frame 3610. Also, the trained model 4000 may recognize features, such as pattern and color, of the searched for images 3621 and 3622. Also, the trained model may recognize features, such as pattern or color, of the resized images generated by resizing the searched for images 3621 and 3622. The trained model 4000 may generate an expanded video generation module to generate expanded videos to be displayed in letterboxes located at portions in the vicinity of both sides of the reference frame 3610 by using the recognized features.

Figure 16:
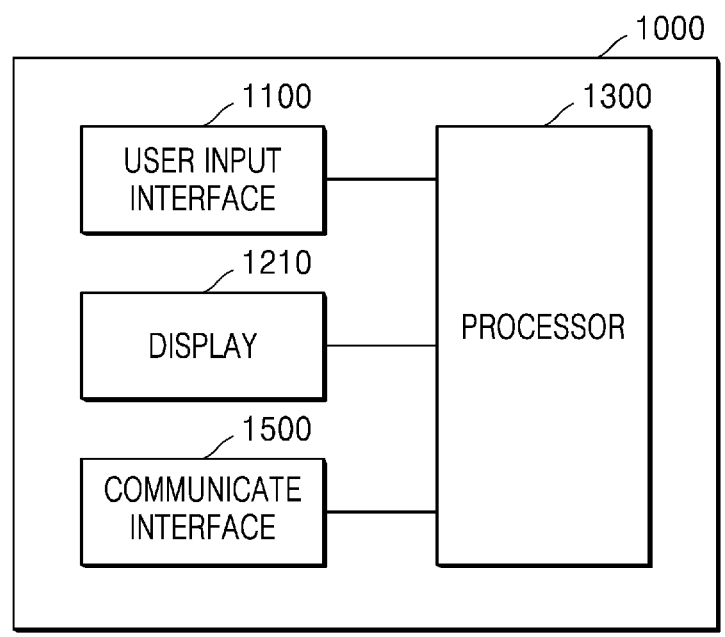
FIGS. 16 and 17 are block diagrams of the device 1000 according to an embodiment.
Figure 17:
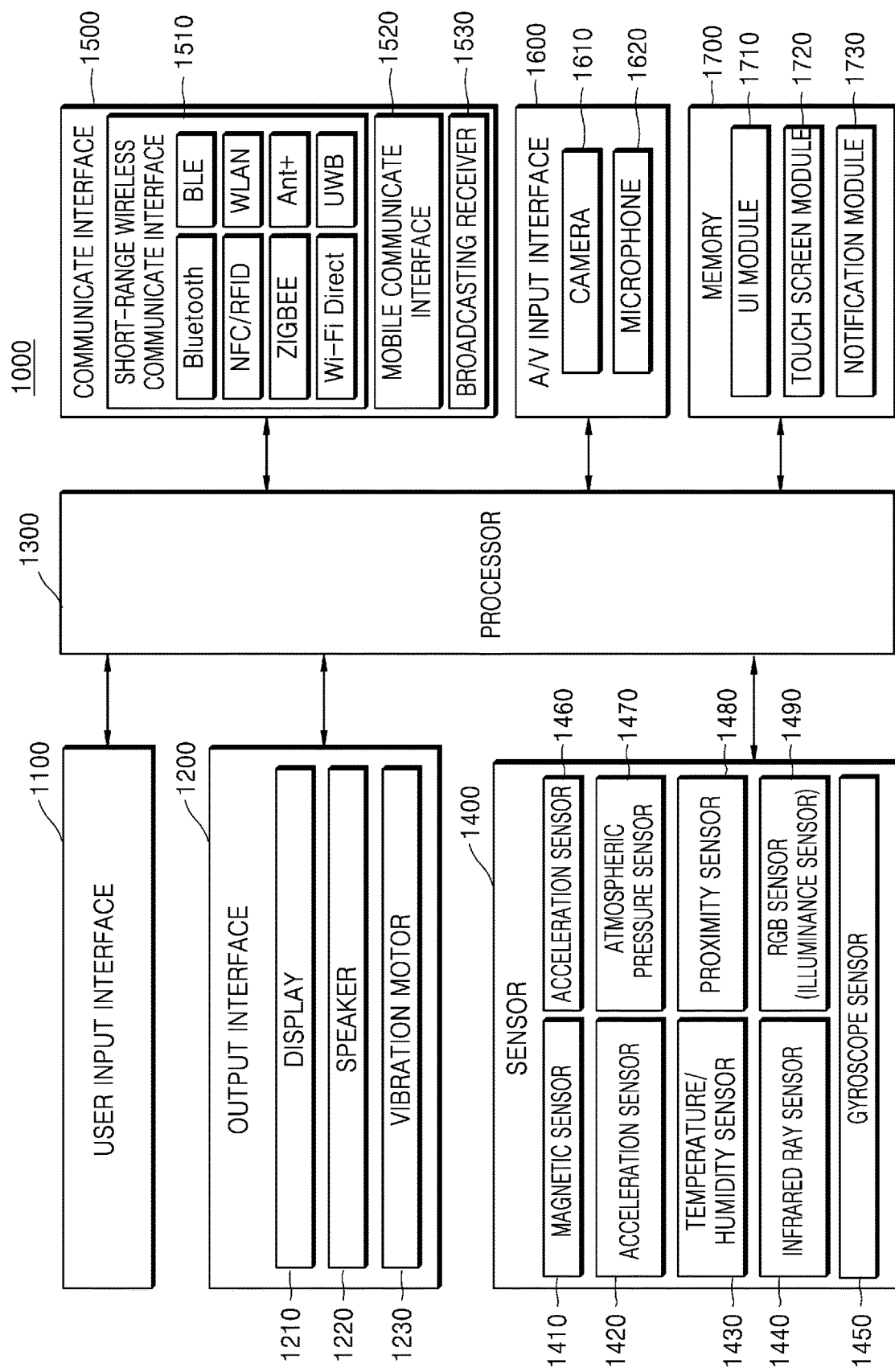

FIGS. 16 and 17 are block diagrams of the device 1000 according to an embodiment.

As shown in FIG. 16, the device 1000 according to an embodiment may include a user input interface 1100, an output interface 1200, a processor 1300, and a communicate interface 1500. However, all elements illustrated in FIG. 16 are not essential elements of the device 1000. The device 1000 may include more elements than those shown in FIG. 16. Or, the device 1000 may include less elements than those shown in FIG. 16.

For example, as shown in FIG. 17, the device 1000 according to an embodiment may further include a sensor 1400, an A/V input interface 1600, and a memory 1700 in addition to the user input interface 1100, the output interface 1200, the processor 1300, and the communicate interface 1500.

The user input interface 1100 refers to a device for inputting data allowing a user to control the device 1000. For example, the user input interface 1100 may be, but is not limited to, a key pad, a dome switch, a touch pad (e.g., a touch capacitive type touch pad, a pressure resistive type touch pad, an infrared beam sensing type touch pad, a surface acoustic wave type touch pad, an integral strain gauge type touch pad, and a piezo electric type touch pad), a jog wheel, or a jog switch.

The user input interface 1100 may receive a user input to select the first video from a video list.

The output interface 1200 may output an audio signal, a video signal, or a vibration signal. The output interface 1200 may include a display 1210, an speaker 1220, and a vibration motor 1230.

The display 1210 includes a screen to display information processed by the device 1000. Also, the screen may display a video. For example, at least one portion of the screen may display the second video including at least one portion of the first video and the expanded video corresponding to the first video. The display may be, for example, a liquid crystal display (LCD), a light-emitting diode (LED) display, an organic light-emitting diode (OLED) display (e.g., an active-matrix organic light-emitting diode (AMOLED) and a passive-matrix OLED (PMOLED), a microelectromechanical systems (MEMS) display, or a flexible display in which an aspect ratio of a screen, which outputs information, is varied by folding or unfolding.

The speaker 1220 outputs audio data received from the communicate interface 1500 or stored in the memory 1700. Furthermore, the speaker 1220 may output an audio signal related to functions processed in the device 1000 (e.g., a call signal receiving sound, a message receiving sound, and a notification sound).

The processor 1300, generally, controls the overall operation of the device 1000. For example, the processor 1300 may control the overall operation of the user input interface 1100, the output interface 1200, the sensor 1400, the communicate interface 1500, the A/V input interface 1600, and the like by executing programs stored in the memory 1700. Also, the processor 1300 may perform functions of the device 1000 described above with reference to FIGS. 1 to 14 by executing the programs stored in the memory 1700.

Specifically, the processor 1300 may control the user input interface 1100 to receive an input of text, an image, and a video from the user. The processor 1300 may control the microphone 1620 to receive a speech input of the user. The processor 1300 may execute an application configured to perform the operation of the device 1000 based on the input of the user and control the application to receive the input of the user. For example, the processor 1300 may control the microphone 1620 to receive a speech input of the user by executing a voice assistant application and controlling the executed application.

The processor 1300 may control the output interface 1200 and the memory 1700 of the device 1000 to display the first video.

When the aspect ratio of the first video is different from the aspect ratio of the first area, the processor 1300 may generate an expanded video to be displayed in the letterbox displayed in the first area.

The processor 1300 may train the AI neural network by inputting training data to the AI neural network. For example, the processor 1300 may generate an expanded video generation module to generate an expanded video by inputting training data to the trained model 4000 stored in the memory 1700 or the server 2000. In this case, it is understood that the processor 1300 includes a graphics processing unit (GPU) or a neural-network processing unit (NPU).

In addition, the processor 1300 may generate an expanded video corresponding to a reference frame included in the video by using the generated expanded video, and this will be described in more detail with reference to FIGS. 19 to 22. In this case, the reference frame is a frame selected as necessary to generate the expanded video. The reference frame to generate the expanded video is described above with reference to FIG. 4, and thus duplicate descriptions will be omitted.

The processor 1300 may extract at least one frame included in the first video.

The processor 1300 may control the output interface 1200 and the memory 1700 of the device 1000 to display the second video including at least one portion of the first video and the expanded video corresponding to the first video.

Also, the processor 1300 may learn a standard for generating an expanded video corresponding to the reference frame included in the video by using the learner and the trained model 4000 stored in the memory 1700 or the server 2000 and may provide an expanded video generation module for generating an expanded video matching the user's intention based on a learning result to the user.

The sensor 1400 may detect a state of the device 1000 and an ambient state of the device 1000 and transmit obtained information to the processor 1300. The sensor 1400 may be used to generate part of information on product specifications of the device 1000, information on a state of the device 1000, information on an ambient environment of the device 1000, information on a state of the user, and information on a history of using the device 1000 by the user.

The sensor 1400 may include at least one selected from a magnetic sensor 1410, an acceleration sensor 1420, a temperature/humidity sensor 1430, an infrared ray sensor 1440, a gyroscope sensor 1450, a position sensor (e.g., GPS) 1460, an atmospheric pressure sensor 1470, a proximity sensor 1480, and a RGB sensor (illuminance sensor) 1490, without being limited thereto. Since functions of the respective sensors may be intuitively inferred by one of ordinary skill in the art, detailed description thereof will be omitted.

The communicate interface 1500 may include at least one element enabling communication between the device 1000 with another external device (not shown) and the server 2000. The external device (not shown) may be a computing device like the device 1000 or a sensing device, without being limited thereto. For example, the communicate interface 1500 may include a short-range wireless communicate interface 1510, a mobile communicate interface 1520, and a broadcasting receiver 1530.

The short-range wireless communicate interface 1510 may include a Bluetooth communicate interface, a Bluetooth low energy (BLE) communicate interface, a near field communicate interface, a wireless local area network (WLAN) or Wi-Fi communicate interface, a Zigbee communicate interface, an infrared data association (IrDA) communicate interface, a Wi-Fi Direct (WFD) communicate interface, an ultra wideband (UWB) communicate interface, and an Ant+ communicate interface, but is not limited thereto.

The mobile communicate interface 1520 may transceive wireless signals to and from at least one of a base station, an external terminal, and a server on a mobile communication network. The wireless signals may include various types of data for transceiving audio call signals, video communication call signals, or text/multimedia messages.

The broadcasting receiver 1530 may receive broadcasting signals and/or information related to broadcasting from the outside via broadcasting channels. The broadcasting channels may include satellite channels and terrestrial channels. According to an embodiment of the present disclosure, the device 1000 may not include the broadcasting receiver 1530.

Also, the communicate interface 1500 may transmit a video to the server 2000.

According to an embodiment, the communicate interface 1500 may transmit at least one portion of the first video stored in the memory 1700 to the server 2000. For example, the communicate interface 1500 may transmit at least one frame extracted from the first video to the server 2000. In another example, the communicate interface 1500 may transmit a video composed of a plurality of frames extracted from the first video to the server 2000. In another example, the communicate interface 1500 may transmit a video obtained by cropping a portion of the first video to the server 2000.

According to an embodiment, the communicate interface 1500 may transmit information on the first video posted on the Internet to the server 2000. For example, the communicate interface 1500 may transmit an identifier (e.g., URL) of the first video to the server 2000. In another example, the communicate interface 1500 may transmit at least one frame extracted from the first video to the server 2000. In another example, the communicate interface 1500 may transmit a video composed of a plurality of frames extracted from the first video to the server 2000.

According to an embodiment, the communicate interface 1500 may receive an expanded video generation module generated by the server.

According to an embodiment, the communicate interface 1500 may receive a video list from the server.

According to an embodiment, the communicate interface 1500 may receive a video from the server.

The audio/video (A/V) input interface 1600 is used to input an audio signal or a video signal and may include a camera 1610, a microphone 1620, and the like. The camera 1610 may obtain image frames of a still image or a moving image via an image sensor in a video call mode or an image capturing mode. An image captured by the image sensor may be processed by the processor 1300 or a separate image processor (not shown). The image captured by the camera 1610 may be used as context information of the user.

The microphone 1620 may receive audio signals from the outside and process the received signals into electrical sound data. For example, the microphone 1620 may receive a sound signal from an external device or the user. The microphone 1620 may receive a speech input of the user. The microphone 1620 may use various algorithms for remove noise generated during a process of receiving an input of external sound signals.

The memory 1700 may store programs for processing and controlling of the processor 1300 and store data input to or output from the device 1000. Also, the memory 1700 may store the video and results of retrieving a video stored in the memory 1700. The memory 1700 may store information related to videos stored in the device 1000 in the device 1000. For example, the memory 1700 may store a path through which a video is stored, a play time of the video, an aspect ratio of the video, whether an expanded video has been generated, and the like.

The memory 1700 may store at least one frame extracted from the video.

The memory 1700 may store an AI neural network. For example, the memory 1700 may store a learner, a trained model, and an expanded video generation module generated by the trained model. Also, the memory 1700 may store expanded videos generated by inputting frames included in a video to the expanded video generation module.

The memory 1700 may include at least one type of storage medium selected from a flash memory type, a hard disk type, a multimedia card micro type, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, or an optical disk.

Programs stored in the memory 1700 may be categorized into a plurality of modules according to functions thereof, e.g., a user interface (UI) module 1710, a touch screen module 1720, and a notification module 1730.

The UI module 1710 may provide a specialized UI, GUI, and the like interworking with the device 1000 according to applications. The touch screen module 1720 may detect a touch gesture of the user on a touch screen and transmit information about the touch gesture to the processor 1300. The touch screen module 1720 according to an embodiment of the present disclosure may recognize and analyze a touch code. The touch screen module 1720 may be configured as a separate hardware component including a controller.

The notification module 1730 may generate a signal for notifying occurrence of an event of the device 1000. Examples of the event occurring in the device 1000 may include receipt of a call signal, receipt of a message, input of a key signal, and notification of a schedule. The notification module 1730 may output a notification signal in a video signal form through a display 1210, output a notification signal in an audio signal form through the speaker 1220, and output a notification signal in a vibration signal form through the vibration motor 1230.

Figure 18:
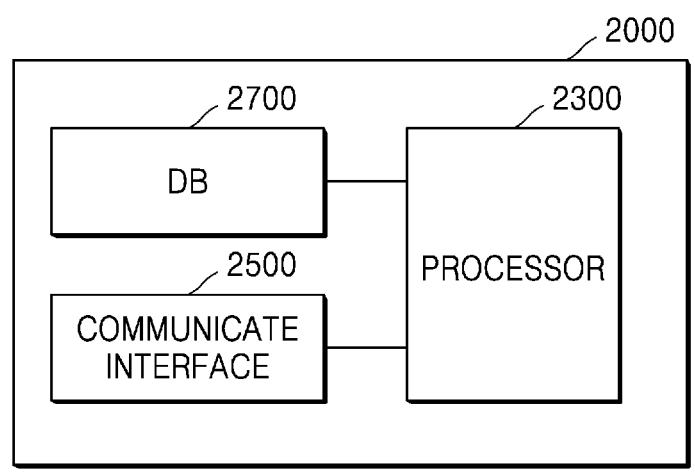
FIG. 18 is a block diagram of a server 2000 according to an embodiment.

FIG. 18 is a block diagram of a server 2000 according to an embodiment.

Referring to FIG. 18, the server 2000 according to an embodiment may include a communicate interface 2500, a DB 2700, and a processor 2300.

The communicate interface 2500 may include at least one component enabling communication with the device 1000.

The communicate interface 2500 may receive a video from device 1000 or transmit a video to the device 1000.

The DB 2700 may store an AI neural network or training data to be input to the AI neural network. For example, the DB 2700 may store a learner, a trained model, and training data to be input to the trained model. The DB 2700 may store an expanded video generation module generated by the trained model.

The DB 2700 may store at least one video. The DB 2700 may store an expanded video corresponding to the at least one video generated by the expanded video generation module. The DB 2700 may store a video in which the at least one video is combined with the expanded video corresponding to the at least one video.

The processor 2300 generally controls the overall operation of the server 2000. For example, the processor 2300 may control the overall operation of the DB 2700, and the communicate interface 2500 by executing programs stored in the DB 2700 of the server 2000. The processor 2300 may perform part of the operation of the device 1000 shown in FIGS. 1 to 15 by executing programs stored in the DB 2700 of the server 2000.

The processor 2300 may perform at least one of a function of extracting a frame from a video, a function of generating training data based on the extracted frame, a function of generating an expanded video generation module by inputting the training data to a trained model, and a function of generating an expanded video by inputting the video to the expanded video generation module.

The processor 2300 may control at least one of data required to extract a frame from a video, data required to generate training data based on the extracted frame, data required to generate an expanded video generation module by inputting training data a trained model, and data required to generate an expanded video by inputting the video to the expanded video generation module.

Figure 19:
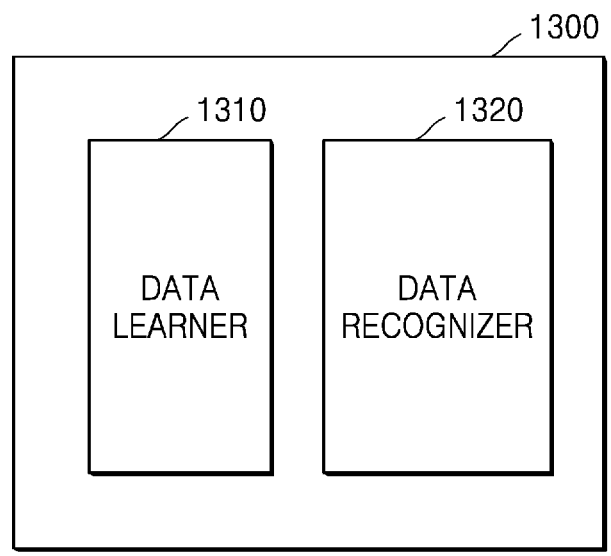
FIG. 19 is a block diagram of a processor 1300 according to an embodiment.

FIG. 19 is a block diagram of a processor 1300 according to an embodiment.

Referring to FIG. 19, the processor 1300 according to an embodiment may include a data learner 1310 and a data recognizer 1320.

The data learner 1310 may learn a standard for generating of an expanded video corresponding to the reference frame included in the video. The reference frame is a frame selected as necessary to generate the expanded video. The reference frame used to generate the expanded video is described above with reference to FIG. and duplicate descriptions will be omitted.

The data learner 1310 may learn the standard for selecting data to generate an expanded video corresponding to the reference frame included in the video. The data learner 1310 may learn a standard for generating an expanded video corresponding to the reference frame include in the video by obtaining data used for learning and applying the obtained data to a data recognition model which will be described below.

For example, the data learner 1310 may learn, as a standard for obtaining training data, obtaining a previous frame and a next frame which may be obtained before and after a preset period of time from the reference frame as training data, obtaining the reference frame and a resized image obtained by resizing the reference frame, obtaining the reference frame and a crop image obtained by cropping the reference frame as training data, and obtaining a found image related to the reference frame as training data. Data to be used for learning and the method of obtaining the same are described above with reference to FIGS. 9 to 15, and thus duplicate descriptions will be omitted.

For example, the data learner 1310 may learn applying a weight to pixels of training data located in the vicinity of the letterboxed areas and applying a weight to pixels of training data located in the vicinity of the same pixels as those of the reference frame, as a standard of learning training data.

The data recognizer 1320 may generate an expanded video corresponding to the reference frame included in the video based on data. The data recognizer 1320 may generate an expanded video corresponding to the reference frame included in the video from preset data by using the updated expanded video generation module. The data recognizer 1320 may obtain preset data in accordance with a standard preset by learning and use the expanded video generation module using the obtained data as an input value. Also, the data recognizer 1320 may generate an expanded video corresponding to the reference frame included in the video based on preset data. In addition, an result value output from the expanded video generation module using the obtained data as the input value may be used to refine the expanded video generation module.

Either one or both of the data learner 1310 and the data recognizer 1320 may be manufactured as at least one hardware chip and built in the device. For example, at least one of the data learner 1310 and the data recognizer 1320 may be manufactured as a dedicated hardware chip for artificial intelligence (AI), or may be manufactured as a part of an existing general-purpose processor (e.g., a central processing unit (CPU) or application processor) or a graphics processor (e.g., a graphic processing unit (GPU)).

In this case, the data learner 1310 and the data recognizer 1320 may be built in one device or may be separately built in different devices. For example, one of the data learner 1310 and the data recognizer 1320 may be included in the device 1000 and the other may be included in the server 2000. Also, the data learner 1310 and the data recognizer 1320 may provide model information constructed by the data learning 1310 to the data recognizer 1320 or provide data input to the data recognizer 1320 to the data learning 1310 as additional training data by wire or wirelessly.

Meanwhile, either one or both of the data learner 1310 and the data recognizer 1320 may be implemented as a software module. When either one or both of the data learner 1310 and the data recognizer 1320 is implemented as a software module (or a program module including instructions), the software module may be stored in a non-transitory computer-readable recording medium. Also, in this case, at least one software module may be provided by an operating system (OS) or a preset application. Alternatively, a part of at least one software module may be provided by the OS, and the remaining part may be provided by the preset application.

Figure 20:
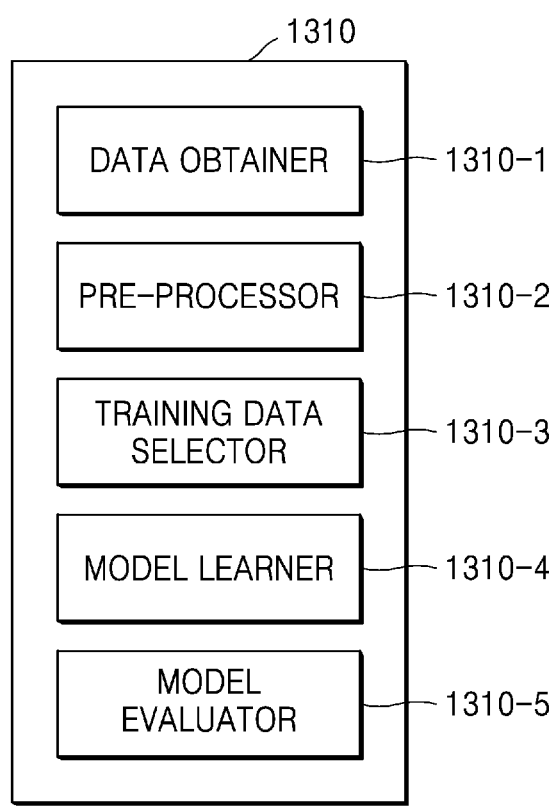
FIG. 20 a block diagram of a data learner 1310 according to an embodiment.

FIG. 20 a block diagram of the data learner 1310 according to an embodiment.

Referring to FIG. 20, the data learner 1310 according to an embodiment may include a data obtainer 1310-1, a pre-processor 1310-2, a training data selector 1310-3, a model learner 1310-4, and a model evaluator 1310-5.

The data obtainer 1310-1 may obtain data required to generate an expanded video corresponding to a video. The data obtainer 1310-1 may obtain, for example, a reference frame included in the video, at least one previous frame played before the reference frame, at least one next frame played after the reference frame, a resized frame obtained by resizing the reference frame, a crop image generated by cropping a portion of the reference frame, and an image related to at least one of a pattern and a color constituting the reference frame.

The pre-processor 1310-2 may pre-process the obtained data such that the data is used for generating the expanded video corresponding to the video. The pre-processor 1310-2 may process the obtained data into a preset format such that the model learner 1310-4 that will be described below may use the obtained data for learning to generate the expanded video corresponding to the video.

The training data selector 1310-3 may select data needed for learning from among pieces of pre-processed data. The selected data may be provided to the model learner 1310-4. The training data selector 1310-3 may select data required for learning from among pieces of data pre-processed according to a preset standard for generating an expanded video corresponding to the video. Also, the training data selector 1310-3 may select data according to a standard preset by learning of the model learner 1310-4 which will be described below.

The model learner 1310-4 may learn a standard about how to generate the expanded video corresponding to the video based on training data. Also, the model learner 1310-4 may learn a standard about how to select training data to be used to generate the expanded video corresponding to the video.

For example, the standard about how to select training data learned by the model learning model may include a standard for selecting a reference frame to be used as training data, a standard for selecting at least one frame among frames, which may be played back before or after a preset time from the reference frame as training data, a standard for selecting the reference frame and a resized image of the reference frame as training data, a standard for selecting the reference frame and a crop image of the reference frame as training data, and a standard for selecting an image related to a category of the video as training data.

Also, the model learner 1310-4 may updates a trained model used to generate the expanded video corresponding to the video by using training data. In this case, the trained model may be a model that is pre-established. For example, the trained model may be pre-established by receiving an input of a basic training data (e.g., sample data).

The trained model may be pre-established in consideration of a field to which a recognition model is applied, the purpose of learning, or the computer performance of the device 1000. The trained model may be a model based on, for example, a neural network. For example, a model such as a deep neural network (DNN), a recurrent neural network (RNN), a bidirectional recurrent deep neural network (BRDNN), and a generative adversarial network (GAN) may be used as the trained model, without being limited thereto.

According to various embodiments, when a plurality of trained models that are pre-established exist, the model learner 1310-4 may determine a trained model having a high relationship between input training data and basic training data as the trained model to be updated. In this case, the basic training data may be pre-classified according to types of data, and the trained model may be pre-established according to the types of data. For example, the basic training data may be pre-classified according to various standards such as an area where the training data is generated, a time for which the training data is generated, a size of the training data, a genre of the training data, a generator of the training data, and a type of an object in the training data.

In addition, the model learner 1310-4 may update the trained model by using a learning algorithm including, for example, error back-propagation or gradient descent.

Also, the model learner 1310-4 may update the trained model via supervised learning, for example, by using training data as an input value. Also, the model learner 1310-4 may update the trained model via unsupervised learning to find a standard for determining a standard for generating the expanded video corresponding to the video by selecting the reference frame of the video and learning the type of data required to generate the expanded video corresponding to the selected reference frame by itself without supervision. Also, the model learner 1310-4 may update the trained model via reinforcement learning using a feedback about whether a result of generating the expanded video corresponding to the video by learning is right.

Also, when the trained model is updated, the model learner 1310-4 may store the expanded video generation module generated using the updated trained model. In this case, the model learner 1310-4 may store the expanded video generation module in a memory of the device including the data recognizer 1320. Alternatively, the model learner 1310-4 may store the expanded video generation module in a DB of the server connected to the device via a wired or wireless network.

In this case, the memory in which the expanded video generation module is stored may also store, for example, a command or data related to at least another element of the device. Also, the memory may store software and/or a program. The program may include, for example, a kernel, middleware, an application programming interface (API), and/or an application program (or an "application").

When the model evaluator 1310-5 inputs evaluation data to the trained model and a recognition result output from the evaluation data does not satisfy a preset standard, the model evaluator 1310-5 may control the model learner 1310-4 to learn again. In this case, the evaluation data may be preset data for evaluation of the trained model.

For example, when the number or a ratio of inaccurate recognition results exceeds a preset threshold value among recognition results of the updated trained model output from evaluation data, the model evaluator 1310-5 may evaluate that the preset standard is not satisfied. For example, when the preset standard is defined as 2%, and the updated trained model outputs more than 20 inaccurate recognition results out of 1000 evaluation data in total, the model evaluator 1310-5 may evaluate that the updated trained model is not appropriate.

Meanwhile, when a plurality of updated trained models exist, the model evaluator 1310-5 may evaluate whether each of the updated trained models satisfies the preset standard and may determine a trained model satisfying the preset standard as a final trained model. In this case, when a plurality of trained models satisfying the preset standard exists, the model evaluator 1310-5 may determine one or a preset number of models that are preset in a descending order of evaluation scores as the final trained model.

Meanwhile, at least one of the data obtainer 1310-1, the pre-processor 1310-2, the training data selector 1310-3, the model learner 1310-4, and the model evaluator 1310-5 of the data learner 1310 may be manufactured as at least one hardware chip and built in the device. For example, at least one of the data obtainer 1310-1, the pre-processor 1310-2, the training data selector 1310-3, the model learner 1310-4, and the model evaluator 1310-5 may be manufactured as a dedicated hardware chip for artificial intelligence (AI) or may be manufactured as a part of an existing general-purpose processor (e.g., a central processing unit (CPU) or application processor) or a graphics processor (e.g., GPU) and built in the device.

Also, the data obtainer 1310-1, the pre-processor 1310-2, the training data selector 1310-3, the model learner 1310-4, and the model evaluator 1310-5 may be built in one device 1000, or may be respectively built in separate devices. For example, some of the data obtainer 1310-1, the pre-processor 1310-2, the training data selector 1310-3, the model learner 1310-4, and the model evaluator 1310-5 may be included in the device, and the other may be included in the server.

In addition, at least one of the data obtainer 1310-1, the pre-processor 1310-2, the training data selector 1310-3, the model learner 1310-4, and the model evaluator 1310-5 may be implemented as a software module. When at least one of the data obtainer 1310-1, the pre-processor 1310-2, the training data selector 1310-3, the model learner 1310-4, and the model evaluator 1310-5 is implemented as a software module (or program module including instructions), the software module may be stored in a non-transitory computer-readable recording medium. Also, in this case, at least one software module may be provided by an operating system (OS) or a preset application. Alternatively, a part of at least one software module may be provided by an OS, and the remaining part may be provided by a preset application.

The processor 1300 may use various trained models and efficiently learn the standard for generating an expanded video corresponding to the video via various methods using the trained model.

Figure 21:
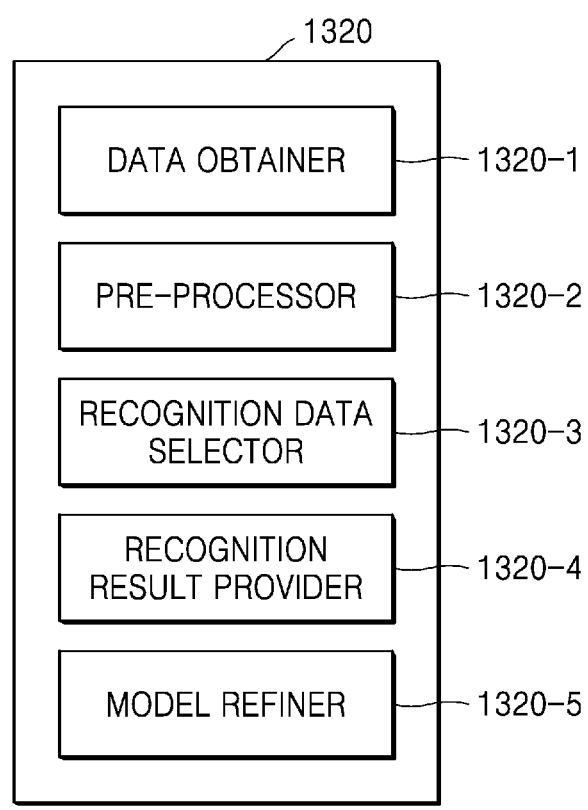
FIG. 21 is a block diagram of a data recognizer 1320 according to an embodiment.

FIG. 21 is a block diagram of the data recognizer 1320 according to an embodiment.

Referring to FIG. 21, the data recognizer 1320 according to an embodiment may include a data obtainer 1320-1, a pre-processor 1320-2, a recognition data selector 1320-3, a recognition result provider 1320-4, and a model refiner 1320-5.

The data obtainer 1320-1 may obtain data for generating an expanded video corresponding to the video. For example, data obtainer 1320-1 may obtain, for example, a reference frame included in the video, at least one previous frame played before the reference frame, at least one next frame played after the reference frame, a resized frame obtained by resizing the reference frame, a crop image generated by cropping a portion of the reference frame, and an image related to at least one of a pattern and a color constituting the reference frame.

The pre-processor 1320-2 may pre-process the obtained data such that the data is used for generating the expanded video corresponding to the video. The pre-processor 1320-2 may process the obtained data into a preset format such that the recognition result provider 1320-4 that will be described below may use the obtained data for learning to generate the expanded video corresponding to the video.

The recognition data selector 1320-3 may select data needed to generate the expanded video corresponding to the video from among pieces of pre-processed data. The selected data may be provided to the recognition result provider 1320-4. The recognition data selector 1320-3 may select some or all pieces of data from among pieces of data pre-processed according to a preset standard preset standard to generate an expanded video corresponding to the video. Also, the recognition data selector 1320-3 may select data according to a standard preset by learning of the model learner 1310-4 which will be described below.

The recognition result provider 1320-4 may generate the expanded video corresponding to the video by applying the selected data to the expanded video generation module. The recognition result provider 1320-4 may provide a recognition result according to a recognition purpose of the data. The recognition result provider 1320-4 may apply the selected data to the expanded video generation module by using the data selected by the recognition data selector 1320-3 as an input value. Also, the recognition result may be determined by the expanded video generation module.

The model refiner 1320-5 may refine the expanded video generation module based on evaluation on the recognition result provided by the recognition result provider 1320-4. For example, the model refiner 1320-5 may allow the model learner 1310-4 to refine the trained model and refine the expanded video generation module by using the refined trained model by providing the recognition result provided by the recognition result provider 1320-4 to the model learner 1310-4.

Meanwhile, at least one of the data obtainer 1320-1, the pre-processor 1320-2, the recognition data selector 1320-3, the recognition result provider 1320-4 and the model refiner 1320-5 may be manufactured as at least one hardware chip and built in the device. For example, at least one of the data obtainer 1320-1, the pre-processor 1320-2, the recognition data selector 1320-3, the recognition result provider 1320-4 and the model refiner 1320-5 may be manufactured as a dedicated hardware chip for artificial intelligence (AI) or may be manufactured as a part of an existing general-purpose processor (e.g., a central processing unit (CPU) or application processor) or a graphics processor (e.g., GPU) and built in the device.

Also, the data obtainer 1320-1, the pre-processor 1320-2, the recognition data selector 1320-3, the recognition result provider 1320-4 and the model refiner 1320-5 may be built in one device 1000, or may be respectively built in separate devices. For example, some of the data obtainer 1320-1, the pre-processor 1320-2, the recognition data selector 1320-3, the recognition result provider 1320-4 and the model refiner 1320-5 may be included in the device 1000, and the other may be included in the server 2000.

In addition, at least one of the data obtainer 1320-1, the pre-processor 1320-2, the recognition data selector 1320-3, the recognition result provider 1320-4 and the model refiner 1320-5 may be implemented as a software module. When at least one of the data obtainer 1320-1, the pre-processor 1320-2, the recognition data selector 1320-3, the recognition result provider 1320-4, and the model refiner 1320-5 is implemented as a software module (or program module including instructions), the software module may be stored in a non-transitory computer-readable recording medium. Also, in this case, at least one software module may be provided by an operating system (OS) or a preset application. Alternatively, a part of at least one software module may be provided by an OS, and the remaining part may be provided by a preset application.

Also, the device 1000 may provide the user with the expanded video matching a user's intention by using the expanded video generation module to which a trained result is applied.

Figure 22:
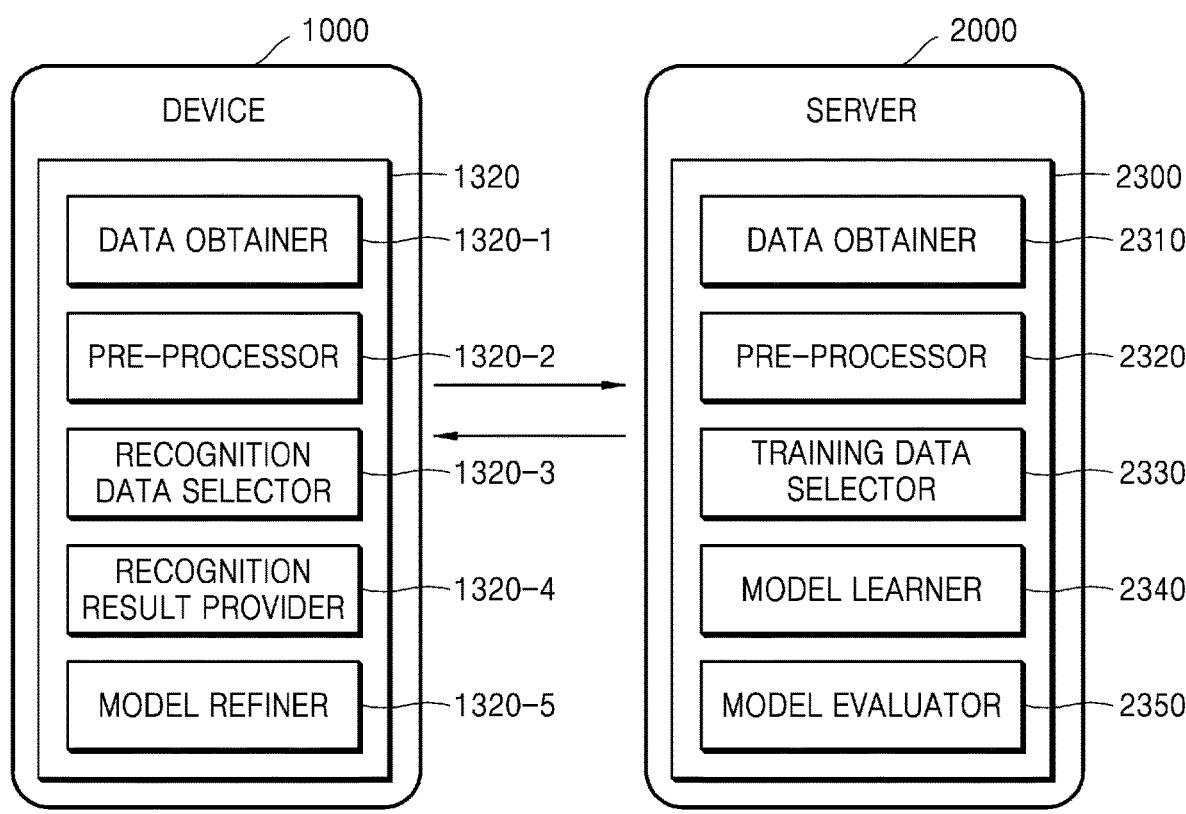
FIG. 22 is a view illustrating an example where the device 1000 and the server 2000, according to an embodiment, interoperate to learn and recognize data, according to an embodiment.

FIG. 22 is a view illustrating an example where the device 1000 and the server 2000 according to an embodiment interoperate to learn and recognize data according to an embodiment.

Referring to FIG. 22, the server 2000 may learn a standard for generating an expanded video corresponding to a video, and the device 1000 may generate the expanded video corresponding to the video based on a learning result of the server 2000.

In this case, a model learner 2340 of the server 2000 may perform the function of the data learner 1310 illustrated in FIG. 19. The model learner 2340 of the server 2000 may learn a standard for selecting data to generate the expanded video corresponding to the video. Also, the model learner 2340 of the server may learn a standard for generating the expanded video corresponding to the video using data. The model learner 2340 may learn a standard for generating the expanded video generation module by obtaining data to be used for learning and applying the obtained data to a trained model which will be described below.

Also, the recognition result provider 1320-4 of the device 1000 may generate the expanded video corresponding to the video by applying data selected by the recognition data selector 1320-3 to the expanded video generation module generated by the server 2000. For example, the recognition result provider 1320-4 may transmit the data selected by the recognition data selector 1320-3 to the server 2000 and request the server 2000 to generate the expanded video corresponding to the video by applying the data selected by the recognition data selector 1320-3 to the expanded video generation module. Also, the recognition result provider 1320-4 may receive information on a method of generating the expanded video corresponding to the video obtained by the server 2000 from the server 2000.

Alternatively, the recognition result provider 1320-4 of the device 1000 may receive the expanded video generation module generated by the server 2000 from the server 2000 and generate the expanded video corresponding to the video by using the received expanded video generation module. In this case, the recognition result provider 1320-4 of the device 1000 may generate the expanded video corresponding to the video by applying the data selected by the recognition data selector 1320-3 to the expanded video generation module received from the server 2000.

In addition, the device 1000 and the server 2000 may effectively divide and perform operations for updating the trained model, generating the expanded video generation module, and recognizing data. Thus, it is possible to efficiently perform data processing and effectively protect the user's privacy in order to provide a service that satisfies the user's intention.

Figure 23:
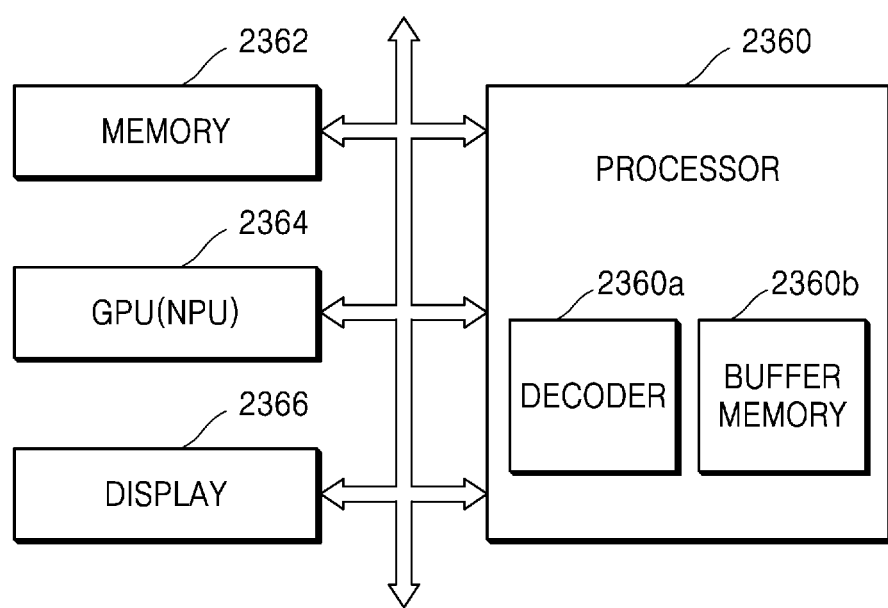
FIG. 23 is a schematic block diagram of a device according to an embodiment.

FIG. 23 is a schematic block diagram of a device according to an embodiment.

Referring to FIG. 23, the device 1000 may include a processor 2360, a memory 2362, a graphics processing unit (GPU) (or neural-network processing unit (NPU)) 2364, and a display 2366. The processor 2360 may include the processor 1300 of FIG. 16. The display 2366 may include the display 1210 of FIG. 16.

According to an embodiment, the device 1000 may further include a decoder 2360a and at least one buffer memory 2360b. For example, the decoder 2360a and the buffer memory 2360b may be included in the processor 2360.

According to an embodiment, the memory 2362 may store the first video and/or the expanded video generation module. The first video may be, for example, a video decoded by the decoder 2360a included in the processor 2360 and stored in the memory 2362.

According to an embodiment, the processor 2360 may obtain the first video stored in the memory 2362 and transmit the first video to the buffer memory 2360b. The processor 2360 may generate a copy of the first video stored in the buffer memory 2360b and transmit the copy to the GPU 2364. According to an embodiment, the GPU (or NPU) 2364 may be a processor optimized for artificial intelligence. The GPU (or NPU) 2364 may be a processor that is more integrated, has less delays, has higher performance, or has more resources than general-use processors. Alternatively, the GPU (or NPU) 2364 may be a processor optimized for matrix computation for artificial intelligence.

According to an embodiment, the GPU 2364 may generate an expanded video using the first video based on instructions of the processor 2360. The processor 2360 may identify an area to be letterboxed when the first video is displayed on the display 2366 and control the GPU 2364 to generate the expanded video to be displayed in a letterboxed area.

For example, when the aspect ratio of the first video is 16:9 and the aspect ratio of the first area of the display 2366 where the video is played back is 18:9, the processor 2360 of the device 1000 may identify the letterboxed area located at portions in the vicinity of left and right sides of the first video. The processor 2360 may obtain an expanded video generation module stored in the memory 2362, store the expanded video generation module in the buffer memory 2360b, and transmit a copy of the expanded video generation module to the GPU 2364. The GPU 2364 may generate an expanded video corresponding to a size of the letterboxed area by using the expanded video generation module and the first video.

The processor 2360 may obtain the expanded video corresponding to the generated edge regions and store the expanded video in the buffer memory 2360b. The processor 2360 may generate the second video by using the expanded video stored in the buffer memory 2360b and the first video. The second video may refer to, for example, a video including, at least one portion of the first video and the expanded video.

According to various embodiments, the GPU 2364 may generate the second video by using the first video. For example, the GPU 2364 may generate the expanded video based on the size of the identified letterboxed area and generate the second video by using the generated expanded video and at least one portion of the first video.

According to an embodiment, the processor 2360 may post-process boundary regions between the first video and the expanded video in the generated second video. The post-processing may be, for example, processing of the boundary regions not to be easily distinguished by the user. For example, the post-processing may be performed by smoothing or color processing on the boundary regions between the first video and the expanded video.

According to various embodiments, the processor 2360 may perform post-processing by applying a deblocking filter to the boundary regions between the first video and the expanded video in the second video.

The device 1000 may obtain a second video having a reduced pixel value difference between pixels located at the boundary regions between the first video and the expanded video.

The processor 2360 may transmit the second video stored in the buffer memory 2360*b* to the display 2366 and control the display 2366 to output the second video.

According to various embodiment, when the user downloads the first video from the server and stores the first video, the device 1000 may perform the above-described process of generating the expanded video before the user watches the first video. However, the embodiment is not limited thereto. The device 1000 may perform the above-described process of generating the expanded video in a situation where the first video is downloaded in a streaming form from the server.

Figure 24:
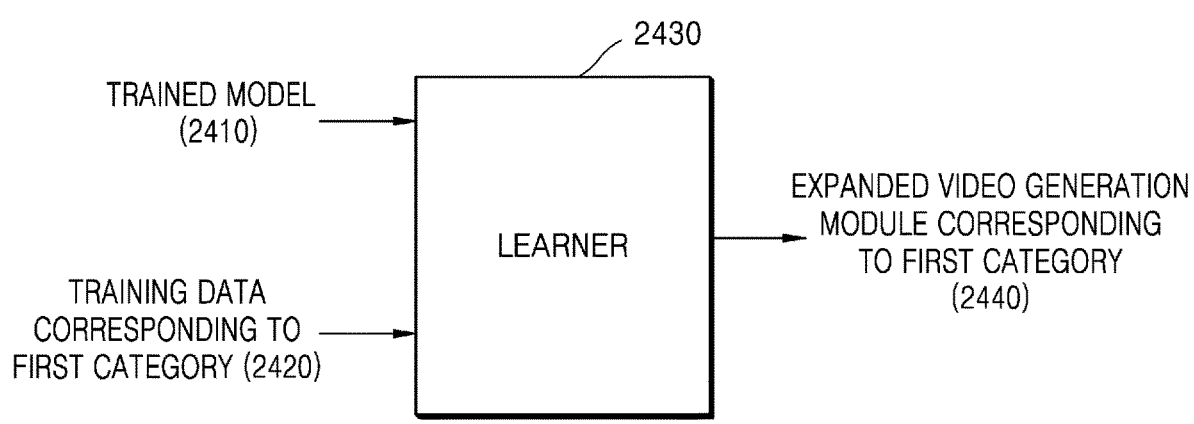
FIG. 24 is a diagram for describing a process of generating an expanded video generation module performed by a device, according to an embodiment.

FIG. 24 is a diagram for describing a process of generating an expanded video generation module performed by a device according to an embodiment.

According to an embodiment, the device 1000 may input a trained model 2410 stored in the memory 2362 or the GPU 2364 and training data 2420 corresponding to a first category stored in the memory 2362 to a learner 2430. The learner 2430 may be, for example, an algorithm set to generate the expanded video generation module 2440 by updating the trained model 2420 by inputting the training data 2420 to the trained model 2410.

The trained model 2410 may be a trained model updated to generate an expanded video corresponding to edge regions of the video. The trained model 2410 may be built therein when the device 1000 is manufactured. Alternatively, the trained model 2410 may be received from the server 2000.

The first category may be, for example, a SF movie, a documentary on nature, a live performance, a 2D animation, a 3D animation, an augmented reality (AR) video, or a hologram video. That is, training data corresponding to the first category may be an image classified as at least one of the categories (e.g.: still image and video). For example, the device 1000 may identify the SF movie as the first category, the documentary on nature as a second category, or the liver performance as a third category.

According to an embodiment, the learner 2430 may perform training by applying the training data 2420 corresponding to the input first category to the trained model 2410. In this case, the learner 2430 may update the trained model 2410 by using training data corresponding to a plurality of first categories.

According to an embodiment, upon completion of updating the trained model 2410 during a preset time or using a preset amount of training data, the learner 2430 may generate the trained model (e.g., an expanded video generation module 2440 corresponding to the first category) updated using training data corresponding to the first category. The device 1000 may store the expanded video generation module 2440 corresponding to the first category in the memory 2362. However, the embodiment is not limited thereto. The device 1000 may also store the expanded video generation module corresponding to the first category in the GPU 2364 described above in FIG. 1.

According to various embodiment, the device 1000 may repeat the above-described process using training data for different categories (e.g., training data for the second category and training data for the third category). The device 1000 may store a plurality of expanded video generation modules corresponding to the different categories and generated as a result of the repeated process in the GPU 2364. When the first video is input, the device 1000 may generate the expanded video of the first video using the expanded video generation module corresponding to the category of the first video and generate the second video.

According to various embodiment, the device 1000 may guide efficient use of the memory 2362 by providing a user interface for deleting the generated expanded video generation module upon request of the user.

Figure 25:
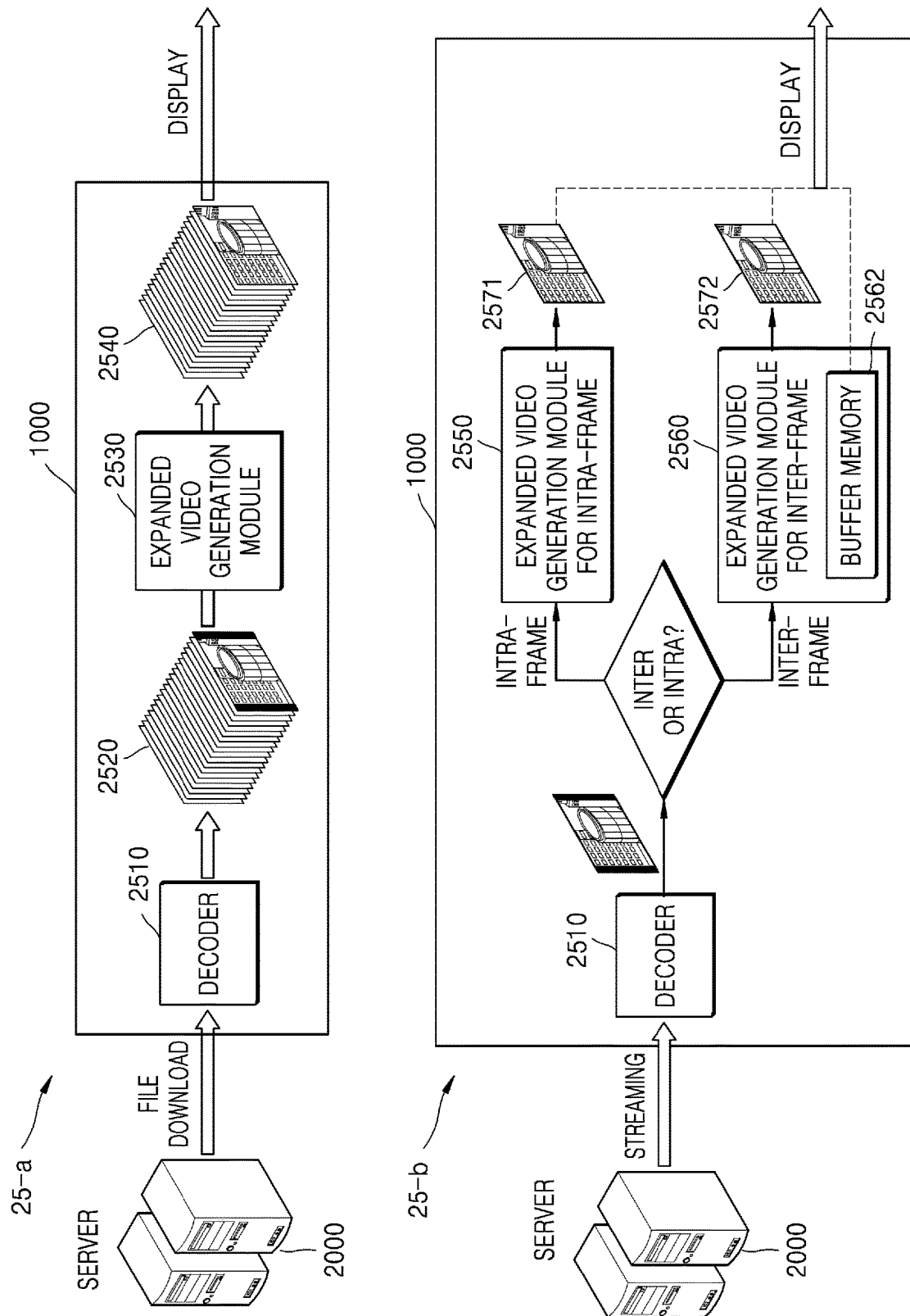
FIG. 25 shows views for describing processes of generating expanded videos according to methods of downloading a first video from a server performed by a device, according to an embodiment.

FIG. 25 shows views for describing processes of generating expanded videos performed by a device according to an embodiment according to methods of downloading a first video from a server.

Referring to reference numeral 25-*a* of FIG. 25, the device 1000 may download the first video from the server 2000 at once.

According to an embodiment, the device 1000 may decode the downloaded first video by using a decoder 2510.

The device 1000 may generate an expanded video or a second video by using the decoded first video 2520. The device 1000 may identify a letterboxed area formed when each of a plurality of frames included in the decoded first video 2520 is displayed and generate the expanded video to be displayed in the letterboxed area by using an expanded video generation module 2530. The device 1000 may generate a second video 2540 by using the generated expanded video and at least one portion of the decoded first video.

The device 1000 may display the generated second video 2540.

Referring to reference numeral 25-*b* of FIG. 25, the device 1000 may download the first video from the server 2000 in a streaming form.

According to an embodiment, the device 1000 may decode frames being downloaded in a streaming form by using the decoder 2510.

The device 1000 may generate expanded videos of the decoded frames by using a plurality of expanded video generation modules in accordance with characteristics of the decoded frames.

According to an embodiment, the device 1000 may identify whether the decoded frame is an intra-frame or an inter-frame.

The intra-frame may refer to, for example, a frame decoded without information from other referential frames in a decoding process of the frame.

The inter-frame may refer to, for example, a frame decoded using other frames that have been already decoded in a decoding process of the frame.

When the decoded frame is an intra-frame, the device 1000 may control an expanded video generation module 2550, which is configured to generate an expanded video of a video by using an input video, to generate an expanded video of the frame by using a central area of the frame. The device 1000 may generate an expanded frame including the generated expanded video and the decoded intra-frame.

When the decoded frame is an inter-frame, the device 1000 may control an expanded video generation module 2560, which is configured to perform an operation of generating an expanded video by using an input video and an operation of generating an expanded video by using another referential frame, to generate an expanded video of the frame by using a central area of the frame and another frame which has been decoded and used to generate an expanded video. In this case, the device 1000 may store the previously expanded frame in a buffer memory 2562 included in the expanded video generation module 2560 or the decoder 2510 and use the frame to expand another inter-frame as a reference. The device 1000 may generate an expanded frame including the generated expanded video and the decoded inter-frame.

According to an embodiment, the device 1000 may generate and display a second video by using the expanded frames 2571 and 2572.

Figure 26:
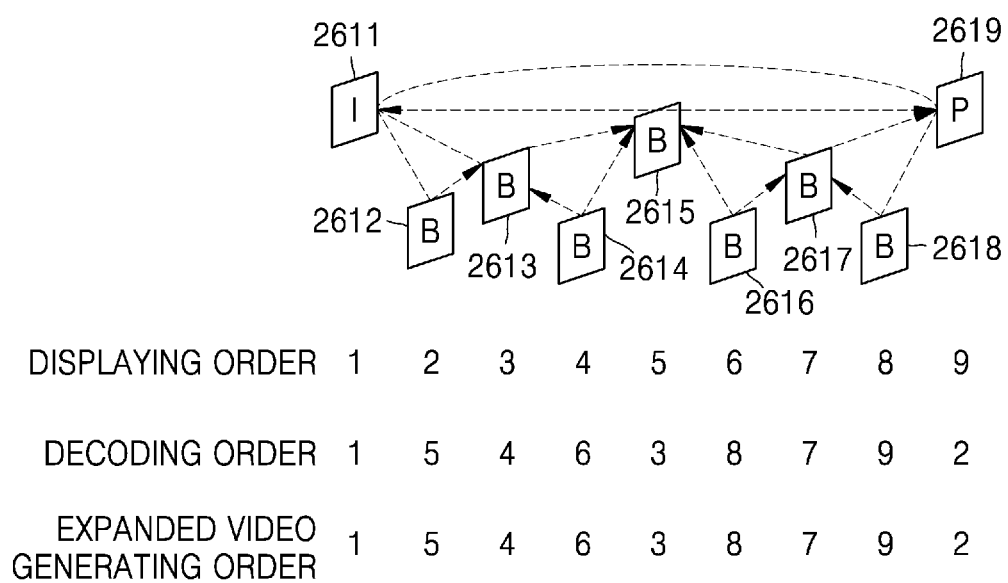
FIG. 26 is a view for describing an order of generating an expanded video of a frame performed by a device, according to an embodiment.

FIG. 26 is a view for describing an order of generating an expanded video of a frame performed by a device according to an embodiment.

According to an embodiment, the device 1000 may determine a decoding order in accordance with characteristics of frames. The device 1000 may proceed generation of the expanded video for the decoded frames.

According to an embodiment, the device 1000 may decode from a first frame 2611 to a ninth frame 2619 and generate an expanded video for the decoded frames. The device 1000 may use different decoding methods according to characteristics of frames.

According to an embodiment, one type of frames may have frame characteristics decoded in the absence of other referential frames in a decoding process. According to various embodiment, 50% or more of frames are decoded in the absence of other referential frames when a frame is decoded. According to an embodiment, frames having such characteristics may be referred to as I frames or Intra-frames.

Alternatively, another type of frames may have frame characteristics decoded using temporally earlier frames when the frame is decoded. According to an embodiment, frames having such characteristics may be referred to as P frames.

Alternatively, another type of frames may have frame characteristics decoded using temporally earlier and later frames when the frame is decoded. According to an embodiment, frames having such characteristics may be referred to as B frames.

Referring to FIG. 26, a first frame 2611 may be an I frame. Second frame 2612 to eighth frame 2618 may be B frames. In addition, a ninth frame 2619 may be a P frame.

The device 1000 according to an embodiment may decode the first frame 2611 and then the ninth frame 2619 according to characteristics of the frames. The device 1000 may generate an expanded video of the first frame 2611 by applying the decoded first frame 2611 to an expanded video generation module configured to generate edge regions of the video by using the input video. The device 1000 may generate an expanded video of the ninth frame 2619 by applying the decoded the ninth frame 2619 to an expanded video generation module configured to perform an operation of generating edge regions of a video using an input video and an operation of generating a video of edges by using another frame available as a reference.

According to an embodiment, the device 1000 may decode a fifth frame 2615 by using the first frame 2611 and the ninth frame 2619. The device 1000 may generate an expanded video of the fifth frame 2615 by applying the decoded fifth frame 2615 to an expanded video generation module configured to perform an operation of generating edge regions of a video using an input video and an operation of generating edge regions of a video by using other frames (e.g.: first frame 2611 and the ninth frame 2619) available as references.

According to an embodiment, the device 1000 may decode frames in the order of a third frame 2613), the second frame 2612, and a fourth frame 2614 and generate edge regions by using the above-described method. Also, the device 1000 may decode frames in the order of a seventh frame 2617, a sixth frame 2616, and the eighth frame 2618 and generate an expanded video by using the above-described method.

According to an embodiment, the device 1000 may sequentially display from the first frame 2611 to the ninth frame 2619 upon completion of decoding and generation of the expanded video. However, the embodiment is not limited thereto. For example, when an expanded video of up to the fourth frame 2614 is generated, the device 1000 may decode the seventh frame 2617, the sixth frame 2616, and the eighth frame 2618 and generate an expanded video thereof while sequentially displaying from the first frame 2611 to the fifth frame 2615.

Figure 27:
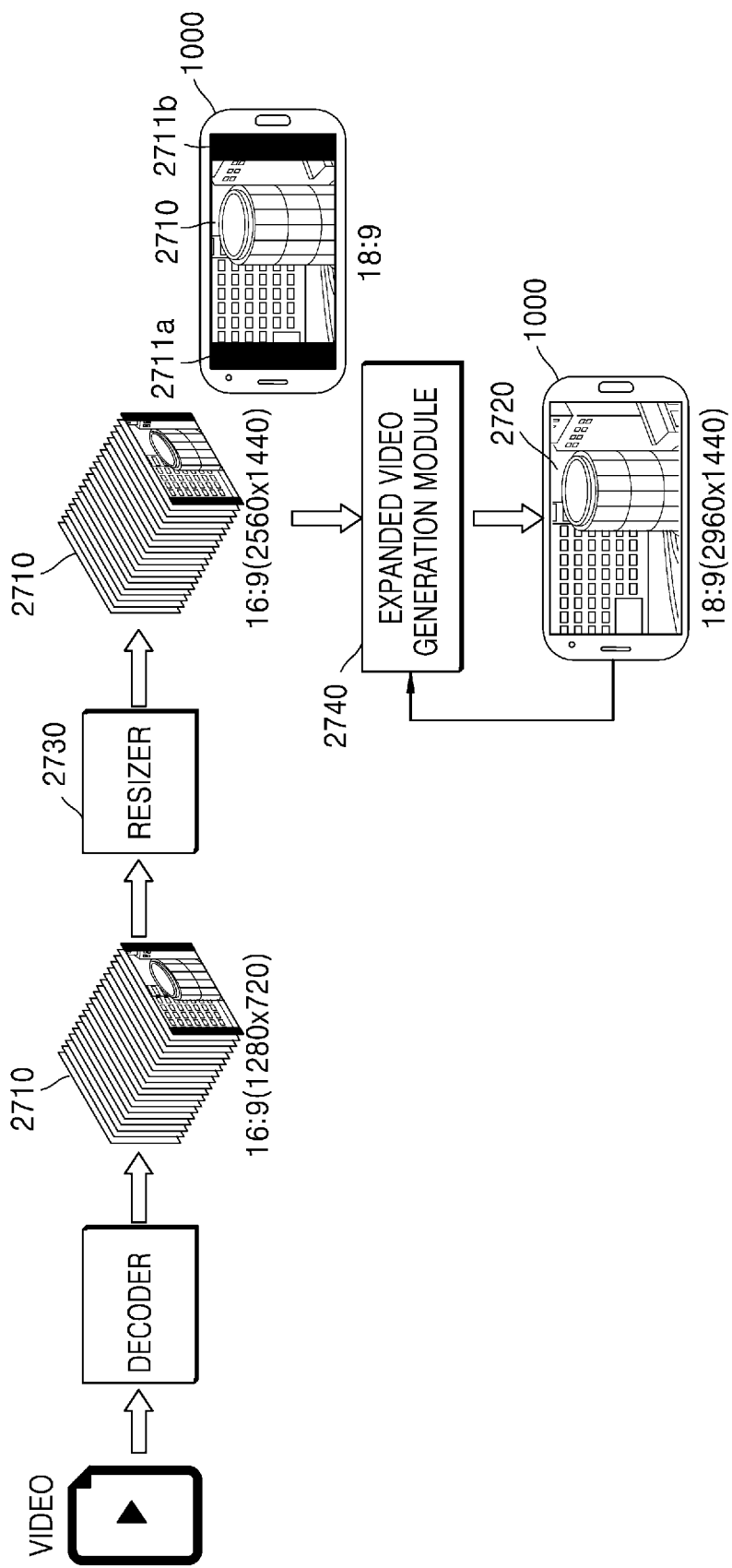
FIG. 27 is a view for describing a situation of resizing a video and generating an expanded video performed by a device, according to an embodiment.

FIG. 27 is a view for describing a situation of resizing a video and generating an expanded video performed by a device according to an embodiment.

Referring to FIG. 27, the device 1000 may magnify the size of the decoded video by using a resizer or scaler 2730. For example, the device 1000 may modify a resolution of a first video 2710 from 1280×720 (aspect ratio of 16:9) to 2560×1440 (aspect ratio of 16:9) by using the resizer 2730.

According to an embodiment, an aspect ratio (e.g.: 16:9) of the first video 2710 to be displayed in the first area may be different from an aspect ratio of the first area (e.g.: 18:9) where the first video 2710 is to be displayed. In this case, the device 1000 may display letterboxes 2711a and 2711b.

According to an embodiment, the device 1000 may generate an expanded video of each of the frames included in the first video 2710 by inputting the first video 2710 to an expanded video generation module 2740. The device 1000 may generate a second video 2720 including the generated expanded video and at least one portion of the first video 2710. The second video 2720 may have a resolution of 2960×1440 and an aspect ratio of 18:9 that is the same as the aspect ratio of the first area.

The device 1000 may display the generated second video 2720.

According to various embodiment, the device 1000 may allow the expanded video generation module to generate edge regions of other frames by inputting frames included in the second video 2720 to the expanded video generation module 2740.

The embodiments of the present disclosure may be embodied as a computer-readable recording medium, e.g., a program module to be executed in computers, which includes computer-readable instructions. The computer-readable recording medium may include any usable medium that may be accessed by computers, volatile and non-volatile medium, and detachable and non-detachable medium. Also, the computer-readable recording medium may include a computer storage medium and a communication medium. The computer storage medium includes all volatile and non-volatile media, and detachable and non-detachable media which are technically implemented to store information including computer-readable instructions, data structures, program modules or other data. The communication medium includes computer-readable instructions, a data structure, or a program module, and includes other information transmission media.

Also, throughout the specification, the "unit" may be a hardware component such as a processor or a circuit and/or a software component executed by the hardware such as the processor.

The above description of the present disclosure is provided for the purpose of illustration, and it would be understood by those skilled in the art that various changes and modifications may be made without changing technical conception and essential features of the present disclosure. Thus, it is clear that the above-described embodiments of the present disclosure are illustrative in all aspects and do not limit the present disclosure. For example, each component described to be of a single type may be implemented in a distributed manner. Likewise, components described to be distributed may be implemented in a combined manner.

The scope of the present disclosure is defined by the following claims and their equivalents rather than by the detailed description of the illustrative embodiments. It shall be understood that all modifications and embodiments conceived from the meaning and scope of the claims and their equivalents are included in the scope of the present disclosure.

The invention claimed is:

1. A server, comprising:
   a memory storing one or more instructions; and
   at least one processor configured to execute the one or more instructions to:
      receive, from a device, identification information of a first video to be displayed in a display area of the device and information regarding an aspect ratio of the display area of the device;
      compare an aspect ratio of the first video with the aspect ratio of the display area of the display;
      determine a category of the first video based on at least one frame included in the first video, based on the aspect ratio of the first video being different from the aspect ratio of the display area;
      select a trained artificial intelligence (AI) model related to the category of the first video;
      obtain an expanded video corresponding to all frames of the first video by applying a reference frame included in the first video to the trained AI model, the expanded video having an aspect ratio corresponding to the aspect ratio of the display area; and
      transmit the expanded video to the device so that the expanded video is displayed in the display area of the device,
   wherein the trained AI model is generated by using the reference frame and at least one related frame associated with the reference frame as training data.

2. The server of claim 1, wherein the at least one processor is further configured to execute the one or more instructions to identify a letterbox to be displayed in the display area based on the aspect ratio of the first video being different from the aspect ratio of the display area.

3. The server of claim 1, wherein the at least one processor is further configured to execute the one or more instructions to:
   extract frames included in the first video;
   generate the training data to be used to generate the trained AI model based on the extracted frames; and
   obtain the expanded video by updating the trained AI model by inputting the training data to the trained AI model.

4. The server of claim 1, wherein the at least one processor is further configured to execute the one or more instructions to generate the trained AI model by using the reference frame and a resized frame obtained by resizing the reference frame as the training data.

5. The server of claim 1, wherein the at least one processor is further configured to execute the one or more instructions to:
   extract the reference frame, at least one previous frame, and at least one next frame included in the first video; and
   generate the trained AI model by using the reference frame, the at least one previous frame, and the at least one next frame as the training data.

6. The server of claim 1, wherein the at least one processor is further configured to execute the one or more instructions to:
   transmit a list comprising identification information of a plurality of videos to the device; and
   receive, from the device, the identification information of the first video as the first video is selected from the list.

7. The server of claim 1, wherein the at least one processor is further configured to execute the one or more instructions to generate frames of the expanded video corresponding to all frames of the first video by training the trained AI model by inputting the reference frame, at least one previous frame, and at least one next frame, to the trained AI model.

8. The server of claim 1, wherein the at least one processor is further configured to execute the one or more instructions to:
   detect at least one of a pattern and a color constituting the reference frame included in the first video;
   search for an image related to the detected at least one of the pattern and the color; and
   generate the trained AI model by using the reference frame and the searched image as the training data.

9. The server of claim 1, wherein the at least one processor is further configured to execute the one or more instructions to:
   identify an object included in the reference frame of the first video; and
   determine the category of the first video according to the object.

10. The server of claim 1, wherein the category comprises at least one from among a science fiction (SF) movie, a documentary, a live performance, a two-dimensional (2D) animation, a three-dimensional (3D) animation, an augmented reality (AR) video, and a hologram video.

11. The server of claim 1, wherein the aspect ratio of the display area varies as the device is folded or unfolded.

12. A method performed by a server, the method comprising:
   receiving, from a device, identification information of a first video to be displayed in a display area of the device and information regarding an aspect ratio of the display area of the device;
   comparing an aspect ratio of the first video with the aspect ratio of the display area in which the first video is to be displayed;
   determining a category of the first video based on at least one frame included in the first video, based on the aspect ratio of the first video being different from the aspect ratio of the display area;
   selecting a trained artificial intelligence (AI) model related to the category of the first video;
   obtaining an expanded video corresponding to all frames of the first video by applying a reference frame included in the first video to the trained AI model, the expanded video having an aspect ratio corresponding to the aspect ratio of the display area; and transmitting the expanded video to the device so that the expanded video is displayed in the display area of the device, wherein the trained AI model is generated by using the reference frame and at least one related frame associated with the reference frame as training data.

13. The method of claim 12, wherein the comparing the aspect ratio of the first video with the aspect ratio of the display area comprises identifying a letterbox to be displayed in the display area based on the aspect ratio of the first video being different from the aspect ratio of the display area.

14. The method of claim 12, wherein the obtaining of the expanded video comprises:

extracting frames included in the first video;

generating the training data to be used to generate the trained AI model based on the extracted frames; and obtaining the expanded video by updating the trained AI model by inputting the training data to the trained AI model.

15. The method of claim 12, wherein the obtaining the expanded video comprises generating the trained AI model by using the reference frame and a resized frame obtained by resizing the reference frame as the training data.

16. The method of claim 12, wherein the obtaining of the expanded video comprises:

extracting the reference frame, at least one previous frame, and at least one next frame included in the first video; and generating the trained AI model by using the reference frame, the at least one previous frame, and the at least one next frame as the training data.

17. The method of claim 12, wherein the obtaining of the expanded video comprises:

transmitting a list comprising identification information of a plurality of videos to the device; and receiving, from the device, the identification information of the first video as the first video is selected from the list.

18. The method of claim 12, wherein the obtaining of the expanded video comprises generating frames of the expanded video corresponding to all frames of the first video by training the trained AI model by inputting the reference frame, at least one previous frame, and at least one next frame, to the trained AI model.

19. The method of claim 12, wherein the obtaining of the expanded video comprises:

detecting at least one of a pattern and a color constituting the reference frame included in the first video;

searching for an image related to the detected at least one of the pattern and the color; and generating the trained AI model by using the reference frame and the searched image as the training data.

20. The method of claim 12, wherein the determining the category of the first video further comprises:

identifying an object included in the reference frame of the first video; and determining the category of the first video according to the object.

* * * * *